(12) United States Patent
Hamamura

(10) Patent No.: US 8,763,322 B2
(45) Date of Patent: Jul. 1, 2014

(54) SOLAR BATTERY MODULE FIXTURE

(75) Inventor: Osamu Hamamura, Osaka (JP)

(73) Assignee: Nissei Kinzoku Co., Ltd., Osaka (JP)

( * ) Notice: Subject to any disclaimer, the term of this patent is extended or adjusted under 35 U.S.C. 154(b) by 0 days.

(21) Appl. No.: 13/994,488

(22) PCT Filed: Sep. 6, 2011

(86) PCT No.: PCT/JP2011/070298
§ 371 (c)(1),
(2), (4) Date: Jun. 14, 2013

(87) PCT Pub. No.: WO2012/086271
PCT Pub. Date: Jun. 28, 2012

(65) Prior Publication Data
US 2013/0263917 A1      Oct. 10, 2013

(30) Foreign Application Priority Data

Dec. 22, 2010  (JP) ................................ 2010-286443

(51) Int. Cl.
*E04D 1/34* (2006.01)
*E04D 3/36* (2006.01)
*E04B 1/24* (2006.01)

(52) U.S. Cl.
CPC .. *E04D 1/34* (2013.01); *E04D 3/36* (2013.01); *E04B 2001/2439* (2013.01)
USPC .................. 52/173.3; 52/506.06; 52/506.05; 52/714; 52/512

(58) Field of Classification Search
CPC ............... E04D 3/36; E04D 1/34; E04B 1/40; E04B 2001/2439; E04B 2001/405
USPC ............ 52/173.3, 23, 26, 701, 704, 707, 708, 52/506.05, 506.06, 365, 364, 235, 52/509–512, 714, 712
See application file for complete search history.

(56) References Cited

U.S. PATENT DOCUMENTS 2,853,870 A * 9/1958 Sinner et al. ..................... 52/378
2,860,504 A * 11/1958 Sinner et al. ..................... 52/378
4,021,989 A * 5/1977 Hala ................................. 52/713
4,523,413 A * 6/1985 Koppenberg ................... 52/139
5,419,091 A * 5/1995 Roberts ............................ 52/509

(Continued)

FOREIGN PATENT DOCUMENTS

JP       08-70132 A      3/1996
JP       09-235844 A     9/1997

(Continued)

OTHER PUBLICATIONS

PCT App. No. PCT/JP2011/070298, International Search Report dated Dec. 13, 2011 (English translation).

(Continued)

*Primary Examiner* — Phi A
(74) *Attorney, Agent, or Firm* — Larry E. Henneman, Jr.; Gregory P. Gibson; Henneman & Associates, PLC

(57) ABSTRACT

[Problem] To be able to reliably fix a solar battery module in an appropriate position on a roof, to have light weight and few components, and to be able to reliably prevent slipping and perform grounding during temporary placement when the fixing position of the solar battery module is adjusted. [Solution] The present invention comprises: a base metal fitting fixed to a rooftop surface; a height-adjusting metal fitting capable of sliding in a vertical direction relative to the base metal fitting; a position-adjusting metal fitting capable of sliding in a horizontal direction relative to the height-adjusting metal fitting; and a fixing metal fitting for sandwiching and fixing the solar battery module between the fixing metal fitting and the position-adjusting metal fitting from the top and bottom, the fixing metal fitting being attached relative to the position-adjusting metal fitting. The position-adjusting metal fitting has: a mounting board part for mounting the solar battery module; a stopper capable of making contact with the edge of a frame provided to the periphery of the solar battery module when the solar battery module is mounted on the mounting board part; and a protrusion for making contact with a conductor part of the frame when the solar battery module is fixed to ensure electrical conductance.

9 Claims, 32 Drawing Sheets

(56) References Cited

U.S. PATENT DOCUMENTS

| | | | |
|---|---|---|---|
| 8,468,765 B1* | 6/2013 | Kim | 52/506.06 |
| 2009/0025314 A1* | 1/2009 | Komamine et al. | 52/173.3 |
| 2010/0101167 A1* | 4/2010 | Morey | 52/506.06 |

FOREIGN PATENT DOCUMENTS

| | | |
|---|---|---|
| JP | 11-186586 A | 7/1999 |
| JP | 2003-278333 A | 10/2003 |
| JP | 2010-163750 A | 7/2010 |

OTHER PUBLICATIONS

PCT App. No. PCT/JP2011/070298, Written Opinion dated Dec. 13, 2011 (English translation).

* cited by examiner (a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(a)

(b)

(a)

(b)

(a)

(b)

(a)

(b)

(c)

(a)

(b)

SOLAR BATTERY MODULE FIXTURE

TECHNICAL FIELD

The present invention relates to a solar battery module fixture for fixing a solar battery module on a slate roof.

BACKGROUND OF THE INVENTION

Generally, attaching a solar battery module to a roof of a house etc. is performed by arranging a plurality of (for example, 4 to 8) fixtures along with outer frame of the solar battery module so that the fixture will be scattered throughout the module and by fixing the fixtures on the roof using a bolt etc.

Specifically, the solar battery module (C) is fixed on a roof (A) by vertically holding a metal frame (E) surrounding an edge of a solar battery panel (D) between base metal fittings (B) and fixing metal fittings (G) which are fixed on the roof (A), as shown in FIG. 32 (a).

However, there is a level difference (J) in a joint part of a roof tile (a slate tile), and thus it was required to provide a height adjusting butyl to eliminate the level difference (J) when the base metal fitting (B) was located on the joint part as illustrated (see two-dot chain line).

On the other hand, there is another known method of fixing in a parallel fashion on the roof a plurality of fixtures consisting of long rail-like members fit to size (length) of the solar battery module attached to the roof, so that the fixtures will extend striding over the level difference (J) of the tile, and of attaching the solar battery module to the fixture.

According to the fixture consisting of rail-like members, a fixation position of the solar battery module can be adjusted along with length direction of the rail-like members, and thus it allows attaching the solar battery module to the roof without being affected by unevenness (the level difference and flexure) of the roof.

However, the rail-like member is not preferable in that it is long and heavy, increasing weight of an object installed on the roof. Moreover, there is another problem that the roof can be imposed a heavy burden and damaged, if the rail-like members are fixed to the roof so that they stride over the level difference of the tile.

FIG. 32 (b) is a longitudinal sectional view of the solar battery module fixed on the roof using the fixture consisting of conventional rail-like members.

The solar battery module (C) is fixed on the roof with a rail-like member (F) and the fixing metal fittings (G) which are fixed on the roof by vertically holding therebetween the metal frame (E) surrounding edges of the solar battery panel (D).

In a case of this fixture structure, however, the solar battery module (C) easily comes off and in the worst case, could possibly fall from the roof, if one of the fixing metal fittings, which are arranged at the edges on both sides of the solar battery module (C) (for example, an eaves edge side of the roof and the opposite side), respectively, is unfixed for some reason.

Additionally, fixing of the solar battery module (C) on the roof is performed by temporarily placing the solar battery module (C) on the rail-like member (F) followed by fixing the solar battery module (C) with a bolt (H) and a nut (I) using the fixing metal fitting (G).

The temporarily-placed solar battery module (C), however, is just placed unfixed and thus unstable, and could possibly slip from the roof.

Furthermore, use of special ground metal fittings (K) for ground processing of the solar battery module (C) increases the number of components and causes decline in construction working efficiency and increase in construction cost.

On the other hand, the technology disclosed in the following patent documents 2 and 3 is known for the technology which can possibly solve the problems related to the above-described temporal placing and the ground processing.

The patent document 2 discloses the technology for preventing the temporarily-placed solar battery module from slipping from the roof by providing a stopper on the fixture for fixing the edges of the solar battery module.

The patent document 3 discloses the technology which can perform ground processing by providing a protrusion on a part of a fixed member for fixing a solar battery panel and contacting the solar battery panel with the protrusion on the fixing.

However, the technology disclosed in these patent documents 2 and 3 cannot adjust fixed position of the solar battery module, and therefore, it has the big disadvantage that it cannot solve the above-described problem about the level difference of the roof.

In order to solve the problem, it occurred to those skilled in the art to use the fixture disclosed in the patent documents 2 and 3 in combination with the rail-like members disclosed in the patent document 1.

Using the fixture disclosed in the patent documents 2 and 3 in combination with the rail-like member disclosed in the patent documents 1, however, increases the number of components and causes decline in construction working efficiency and increase in construction cost.

Furthermore, it has another big disadvantage that when the fixed position of the solar battery module is adjusted, slip prevention function and ground processing function do not adjust accordingly. In short, position adjustment function does not depend on the same metal fittings as the slip prevention function and ground processing function depends on. Therefore, the slip prevention function for the temporarily-placed solar battery module and ground processing function possibly can not be fulfilled when the fixed position of the solar battery module is adjusted.

PRIOR-ART DOCUMENTS

Patent Documents

[Patent Document 1] JP Tokukaihei 8-70132
[Patent Document 2] JP Tokukai2003-278333
[Patent Document 3] JP Tokukaihei 11-186586

SUMMARY OF THE INVENTION

Problems to be Solved by the Invention

The present invention provides a solar battery module fixture for solving the above-described problems of the prior art, which can adjust fixed position of the solar battery module and securely fix the solar battery module on a suitable position on a slate roof without being affected by level difference and flexure of the roof and without imposing a heavy burden on the roof, has light-weight and requires less number of components, and can fulfill reliably slip prevention function for the temporarily-placed solar battery module and ground processing function when its fixed position is adjusted.

Means to Solve the Problems

The solar battery module fixture of the present invention is provided for fixing the solar battery module on a slate roof, comprising: a plurality of base metal fittings to be fixed on a top surface of said roof, a height-adjusting metal fitting attached to said base metal fittings so that it can slide longitudinally, a position-adjusting metal fitting attached to said height-adjusting metal fitting so that it can slide laterally, and a fixing metal fitting attached to said position-adjusting metal fitting for fixing the solar battery module by vertically holding the solar battery module with said position-adjusting metal fitting, wherein said position-adjusting metal fitting comprises a mounting board part for placing the solar battery module, a stopper which can come into contact with edges of a frame provided around said solar battery module when it is placed on said mounting board part, and a protrusion for ensuring electric connection with said frame by coming into contact with a conducting part of said frame while said solar battery module is fixed.

In a solar battery module fixture according to one aspect of the present invention, said base metal fittings consist of a plate-like fixed part fixedly-contacting with said top surface of said roof and a plate-like extending part arranged perpendicular to said top surface of said roof, said height-adjusting metal fitting consists of a first plate-like part arranged perpendicular to said top surface of said roof and a second plate-like part arranged in parallel to said top surface of said roof, said first plate-like part has a first long hole extending perpendicular to the top surface of said roof, said second plate-like part has a second long hole extending in parallel to said top surface of said roof, said height-adjusting metal fitting is attached to said base metal fittings by fixing said plate-like extending part and said first plate-like part with a bolt inserted into said first long hole, so that said height-adjusting metal fitting can slide longitudinally, said position-adjusting metal fitting is attached to said height-adjusting metal fitting by fixing said mounting board part and said second plate-like part with a bolt inserted into said second long hole, so that said position-adjusting metal fitting can slide laterally.

In the solar battery module fixture according to one aspect of the present invention, said first plate-like part of said height-adjusting metal fitting has a left-and-right pair of lancing parts which project in an extending direction of said second plate-like part and are extending in parallel to said first long hole, with a plate-like extending part of said base metal fitting being held between said left-and-right pair of lancing parts.

In the solar battery module fixture according to one aspect of the present invention, said fixing metal fitting consists of a first fixing metal fitting arranged at the end of a plurality of solar battery modules arranged on the roof and a second fixing metal fitting arranged among said plurality of solar battery modules, said first fixing metal fitting is formed by folding a flat plate in a staircase pattern so that said flat plate can have two lateral parts and two longitudinal parts, said two longitudinal parts are two-tiered in parallel to each other, an upper longitudinal part of said two-tiered longitudinal parts comes into contact with outer edge of said frame of said solar battery module and a lower longitudinal part positions an eave cover for covering end surface on eaves edge side of said solar battery modules.

In the solar battery module fixture according to one aspect of the present invention, said position-adjusting metal fitting consists of a first position-adjusting metal fitting arranged at the eaves edge side of a roof, and a second position-adjusting metal fitting arranged at the other side of the roof, said first position-adjusting metal fitting comprises an eaves cover fixed part for fixing the eaves cover which covers the eaves edge side of the solar battery module, said second position-adjusting metal fitting comprises said two stoppers arranged with some space therebetween, and said stoppers come into contact with an inner edge of said frame.

In the solar battery module fixture according to one aspect of the present invention, the plate-like fixed part of said base metal fittings consists of a first fixed part extending in one direction, and a second fixed part extending in a direction opposite to the direction in which the first fixed part is extending, said second fixed part is formed by making U-shape cut in a part of said plate-like extending part and folding the U-shape cut, and a protrusion formed by upwardly transforming a board forming said plate-like fixed part is provided so that a projection part strides over said first fixed part and said second fixed part.

In the solar battery module fixture according to one aspect of the present invention, said position-adjusting metal fitting consists of a common position-adjusting metal fitting with a common structure arranged at the eaves edge side and at the other side of a roof, said stopper consists of one stopper which can come into contact with outer edge of said frame, and said protrusion is formed by upwardly folding corners of said mounting board part.

In the solar battery module fixture according to one aspect of the present invention, said first fixing metal fitting and said second fixing metal fitting are separately fixed to said height-adjusting metal fitting and said position-adjusting metal fitting by a bolt and a nut, said first fixing metal fitting and said second fixing metal fitting are provided with through holes for insertion of said bolt, said through holes are formed by connecting a narrow width part which is narrower than a diameter of said nut and a wide width part which is wider than a diameter of said nut.

In the solar battery module fixture according to one aspect of the present invention, an upwardly-folded projection is formed at the edge of said wide width part.

Effects of the Invention

According to the present invention, the solar battery module comprises a plurality of base metal fittings to be fixed on a top surface of a roof, a height-adjusting metal fitting attached to the base metal fittings so that it can slide longitudinally, a position-adjusting metal fitting attached to the height-adjusting metal fitting so that it can slide laterally, and a fixing metal fitting attached to the position-adjusting metal fitting for fixing the solar battery module by vertically holding the solar battery module with the position-adjusting metal fitting, therefore, the solar battery module can be slidably moved longitudinally and laterally. This allows for adjustment of the fixed position of the solar battery module and secure fixture of the solar battery module to a suitable position on the roof without being affected by level difference and flexure of a slate roof.

Furthermore, the solar battery module fixture fixes the base metal fittings on a top surface of the roof, slidably attaches a height-adjusting metal fitting to the base metal fittings, and slidably attaches a position-adjusting metal fitting to the height-adjusting metal fitting. Therefore, the solar battery module fixture requires no fixture of long rail-like member on the roof for position adjustment of the solar battery module, and can reduce the fixture's weight and fix the solar battery module without imposing any burden on the roof, so that the position of the solar battery module can be adjusted.

Additionally, the position-adjusting metal fitting comprises a mounting board part for placing the solar battery module, a stopper which can come into contact with edge of a frame provided around the solar battery module when the solar battery module is placed on the mounting board part, and a protrusion for ensuring electric connection with the frame by coming into contact with a conducting part of the frame while the solar battery module is fixed. Therefore, when the solar battery module is temporarily-placed on the mounting board part, the stopper can prevent the module from slipping from the board part and a ground processing function can also be fulfilled. In addition, both the stopper and the protrusion are provided at the position-adjusting metal fitting and therefore, they integrally slide together with the position-adjusting metal fitting when the position of the solar battery module is adjusted. Therefore, when the fixed position of the solar battery module is adjusted, slip prevention function for the temporarily-placed solar battery module and ground processing function can be fulfilled, too.

According to one aspect of the present invention, the height-adjusting metal fitting has a first long hole extending perpendicular to the top surface of the roof on a first plate-like part and a second long hole extending in parallel to the top surface of the roof on a second plate-like part. By the use of these two types of long holes, the height-adjusting metal fitting is attached to the base metal fittings so that it can slide longitudinally, and the position-adjusting metal fitting is attached to the height-adjusting metal fitting so that it can slide laterally. As such, the functions for sliding the metal fittings to longitudinal and lateral directions can be consolidated into one metal fitting (the height-adjusting metal fitting), allowing the improvement of working efficiency of the height adjusting and position adjustment. Additionally, when it is required to change height adjusting range and position adjustment range, all we have to do is just to replace the height-adjusting metal fittings, which leads to reduction of the number of components.

According to one aspect of the present invention, the first plate-like part of the height-adjusting metal fitting has a left-and-right pair of lancing parts which project in an extending direction of the second plate-like part and are extending in parallel to the first long hole, with a plate-like extending part of the base metal fittings being held between the left-and-right pair of lancing parts. Therefore, when the height-adjusting metal fitting is longitudinally slid to the base metal fittings, the lancing parts function as a guide, allowing the height-adjusting metal fitting to smoothly slide without tilting obliquely. In addition, no other component for the guide is necessary, allowing reduction of the fixture's weight and the number of components.

According to one aspect of the present invention, the fixing metal fitting consists of a first fixing metal fitting arranged at ends of a plurality of solar battery modules arranged on the roof and a second fixing metal fitting arranged among the plurality of solar battery modules, the first fixing metal fitting is formed by folding a flat plate in a staircase pattern so that said flat plate can have two lateral parts and two longitudinal parts, the two longitudinal parts are two-tiered in parallel to each other, an upper longitudinal part of the two-tiered longitudinal parts comes into contact with outer edge of the frame of the solar battery modules and a lower longitudinal part positions an eaves cover for covering end surface on eaves edge side of the solar battery modules. Therefore, the first fixing metal fitting can fulfill the position adjustment function of the solar battery module and the eaves cover, and can correctly determine positional relation of the solar battery module and the eaves cover and attach the cover to the module.

According to one aspect of the present invention, the position-adjusting metal fitting attached to the height-adjusting metal fitting so that it can slide laterally consists of a first position-adjusting metal fitting arranged at the eaves edge side of the roof and a second position-adjusting metal fitting arranged at the other side of the roof. Therefore, just one type of height-adjusting metal fitting is necessary for attachment partners corresponding to the two types of position-adjusting metal fittings. Consequently, the number of components can be reduced, it is not necessary to properly use the height-adjusting metal fittings depending on types of the position-adjusting metal fittings, and thus the working efficiency of construction will be improved.

Furthermore, the first position-adjusting metal fitting is provided with an eaves cover fixed part for fixing the eaves cover which covers the eaves edge side of the solar battery module, the eaves cover can securely cover the eaves edge side of the solar battery module. It will make appearance of the solar battery module significantly better.

Additionally, the second position-adjusting metal fitting comprises the two stoppers arranged with some space therebetween. Therefore, one second position-adjusting metal fitting can fulfill slip prevention function when the two solar battery modules are temporarily-placed on the roof. It can reduce the number of components, improve the working efficiency, and cut the construction cost.

According to one aspect of the present invention, the plate-like fixed part of the base metal fitting consists of a first fixed part extending in one direction, and a second fixed part extending in a direction opposite to the direction in which the first fixed part are extending. Therefore, the base metal fittings are securely fixed on a top surface of the roof.

Since the second fixed part is formed by making U-shape cut in a part of the plate-like extending part and folding the U-shape cut, the fixture can be reduced in weight and the cute part can function as a weep hole.

Furthermore, considering that a projection part formed by upwardly transforming a board forming the plate-like fixed part is provided so that the protrusion strides over said first fixed part and said second fixed part, the projection part reinforces a part striding over from the first fixed part to the second fixed part, thereby making it possible to prevent the first fixed part and the second fixed part from being bent, keep the both fixed parts on the same plane, and securely fix the both fixed parts along the top surface of the roof. In addition, no other component is necessary for the reinforcement, thereby allowing improvement of the strength without increasing the weight of the base metal fittings.

According to one aspect of the present invention, the position-adjusting metal fitting consists of a common position-adjusting metal fitting with a common structure arranged at the eaves edge side and at the other side of a roof, the common position-adjusting metal fitting consists of one stopper which can come into contact with outer edge of a frame. Since the protrusion is formed by upwardly folding corners of the mounting board part, only one type of the position-adjusting metal fitting is needed and thus the number of the components can be reduced, thereby improving construction efficiency. Since the one stopper can come into contact with outer edge of the frame, it can fulfill slip prevention function to the temporarily-placed solar battery module and be used with several kinds of frames with different width, that is, it has broad utility. In addition, the protrusion can be formed easily and can be changed easily in size and height.

According to one aspect of the present invention, the first fixing metal fitting and the second fixing metal fitting are separately fixed to the height-adjusting metal fitting and the position-adjusting metal fitting by a bolt and a nut, the first fixing metal fitting and the second fixing metal fitting are provided with through holes for the bolt insertion, the through holes are formed by connecting a narrow width part which is narrower than a diameter of the nut and a wide width part which is wider than a diameter of the nut. Therefore, it is not necessary to take the trouble to remove the nut when attaching the fixing metal fitting, thereby improving construction.

According to one aspect of the present invention, a folded projection is formed at the edge of the wide width part, wherein the folded projection is upwardly folded. Therefore, this folded projection can function to prevent the nut from moving when the first fixing metal fitting and the second fixing metal fitting are provided at and attached on the side of the common position-adjusting metal fitting, and to securely fix the fixing metal fitting.

DETAILED DESCRIPTION OF THE INVENTION

Hereinafter, preferred embodiments of the solar battery module fixture according to the present invention will be set forth with reference to drawings.

The solar battery module fixture according to the present invention is provided for fixing a solar battery module on a slate roof and comprises a base metal fitting, a height-adjusting metal fitting, a position-adjusting metal fitting, and a fixing metal fitting.

First, a first embodiment of the solar battery module fixture according to the present invention will be set forth.

Figure 1:
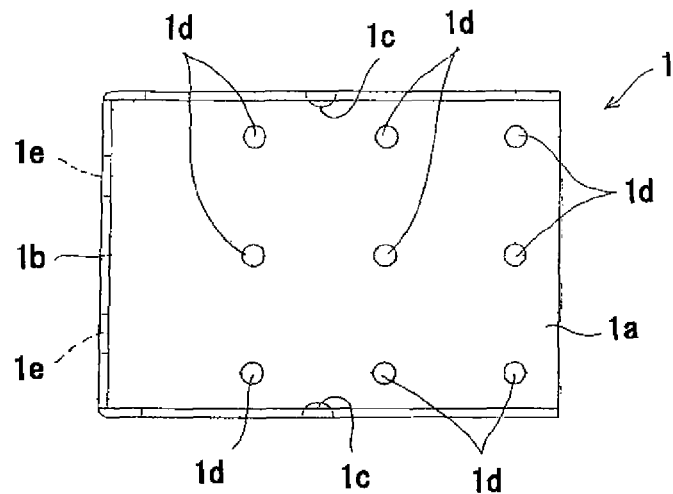
[FIG. 1] It shows a base metal fitting according to a solar battery module fixture of a first embodiment of the present invention. (a) is a plan view, (b) is a front view, and (c) is a right side view.
Figure 1:
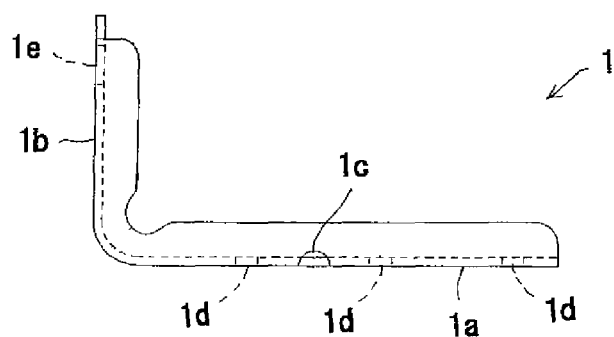
Figure 1:
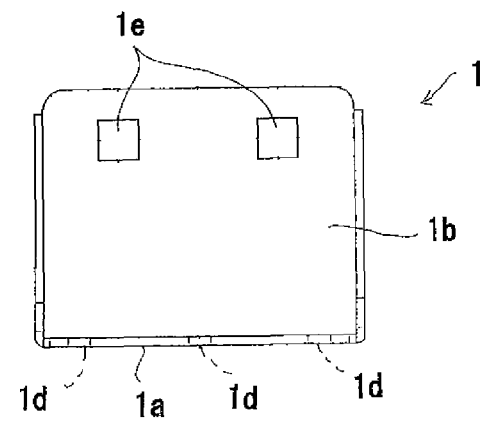

FIG. 1 shows a base metal fitting (1). (a) is a plan view, (b) is a front view, and (c) is a right side view.

The base metal fitting (1) is fixed to a top surface of a slate roof, consists of a plate-like fixed part (1a) fixedly-contacting with the top surface of the roof and a plate-like extending part (1b) arranged perpendicular to the top surface of the roof, and as a whole is bent into L-shape in a front view.

The plate-like fixed part (1a) has several through holes (1c) (1d). Although the number of the through holes (1c) (1d) is not specifically limited, two through holes (1c) and nine through holes (1d) are formed in the illustrated drawings. Among these through holes (1c) (1d), the through holes (1c) formed at the both ends in the width direction of the plate-like fixed part (1a) are used as weep holes, and the remaining through holes (1d) are used as screw insertion holes in order to fix the base metal fitting (1) to the top surface of the roof. The plate-like extending part (1b) has several (two in the illustrated drawing) through holes (1e). The through holes (1e) are square-shaped and are provided side by side in the width direction of the plate-like extending part (1b).

Figure 2:
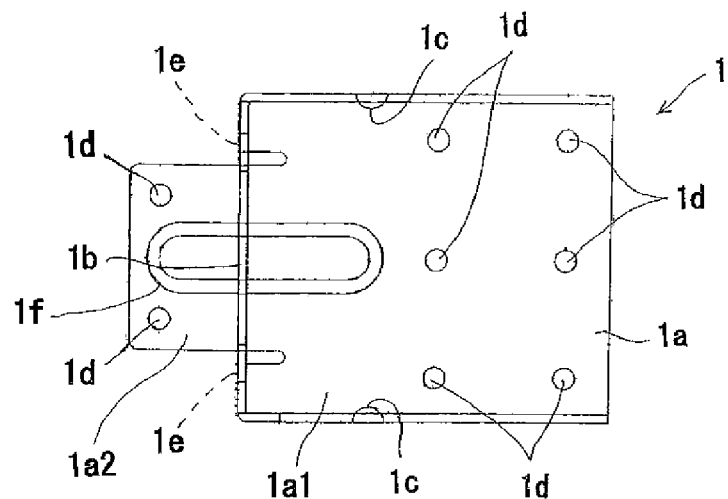
[FIG. 2] It shows a modified base metal fitting according to a solar battery module fixture of a first embodiment of the present invention. (a) is a plan view, (b) is a front view, and (c) is a right side view.
Figure 2:
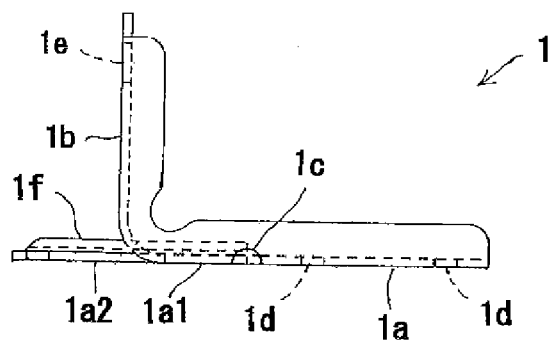
Figure 2:
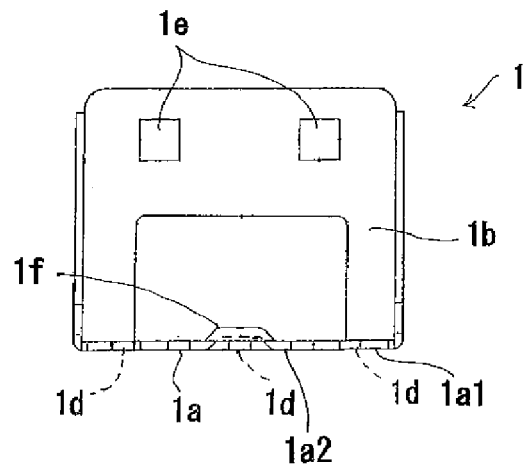

FIG. 2 shows a modified base metal fitting (1). (a) is a plan view, (b) is a front view, and (c) is a right side view.

The difference between the modified base metal fitting and the base metal fitting in FIG. 1 will be explained.

The plate-like fixed part (1a) consists of a first fixed part (1a1) extending in one direction, and a second fixed part (1a2) extending in a direction opposite to the direction in which the first fixed part is extending. Therefore, the base metal fitting is as a whole inverted T-shaped in a front view.

The second fixed part (1a2) is formed by making from bottom up U-shape cut in a part of the plate-like extending part (1b) in the form of a square and then folding the U-shape cut toward the opposite side of the second fixed part (1a1). This allows the base metal fitting to be more securely fixed to the top surface of the roof. Since the second fixed part (1a2) is formed by making U-shape cut in a part of the plate-like extending part and folding the U-shape cut, a fixture can be reduced in weight (the second fixed part can be provided without increasing its weight) and the cut part can function as a weep hole.

In addition, an oval ring-shaped projection part (1f) in a planar view is provided to stride over the first fixed part (1a1) and the second fixed part (1a2). The projection part (1f) is formed by pushing up a board (a metal plate) forming the plate-like fixed part (1a) and upwardly transforming the board.

This configuration can reinforce the part striding over the first fixed part (1a1) and the second fixed part (1a2) of the base metal fitting (1) and prevent a part along the top surface of the roof from being folded. In addition, no other component is necessary for this reinforcement, thereby allowing the reinforcement without increasing the weight of the base metal fitting.

Figure 3:
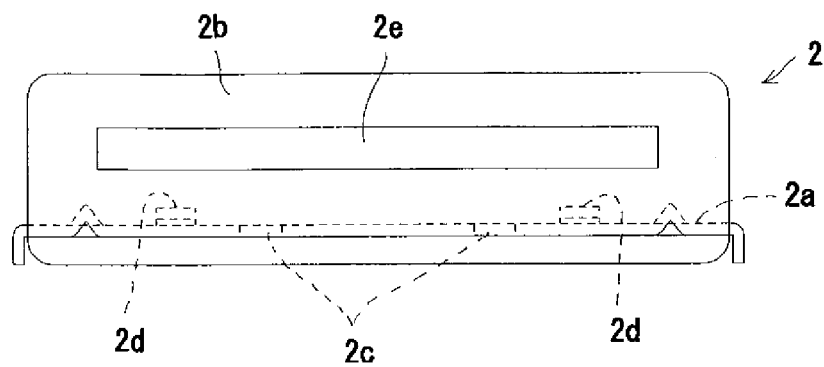
[FIG. 3] It shows a height-adjusting metal fitting according to a solar battery module fixture of a first embodiment of the present invention. (a) is a plan view, (b) is a front view, and (c) is a right side view.
Figure 3:
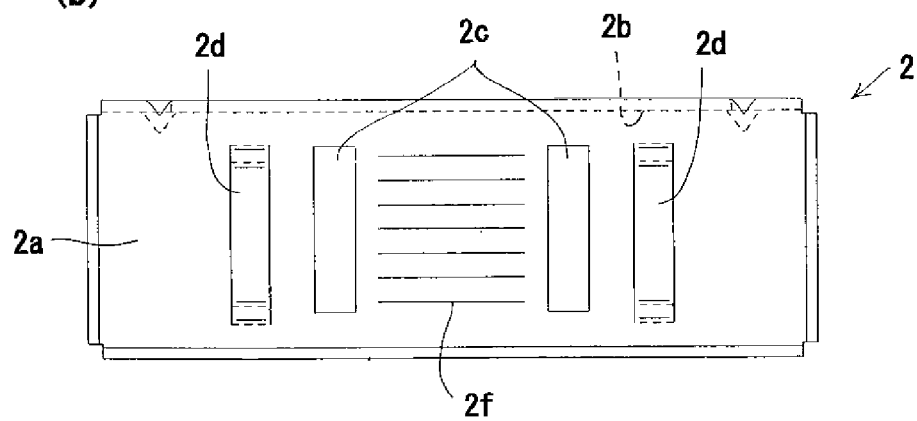
Figure 3:
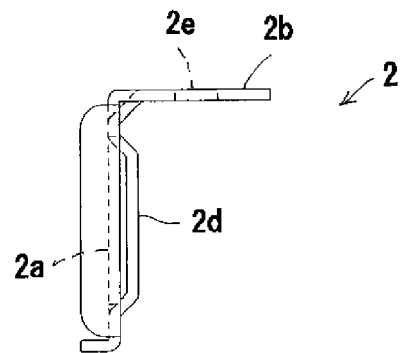

FIG. 3 shows a height-adjusting metal fitting (2). (a) is a plan view, (b) is a front view, and (c) is a right side view.

The height-adjusting metal fitting (2) is attached to the base metal fitting (1) so that it can slide longitudinally (vertically), consists of a first plate-like part (2a) arranged perpendicular to the top surface of the roof and a second plate-like part (2b) arranged in parallel to the top surface of the roof, and as a whole is bent into L-shape in a side view.

The first plate-like part (2a) has first long holes (2c), lancing parts (2d), and a scale (2f).

A plurality of (two in the illustrated drawing) first long holes (2c) are formed in parallel to each other so as to extend in a longitudinal direction on the top surface of the roof.

The lancing parts (2d) are formed in pairs on both left and right sides so as to project in an extending direction of the second plate-like part (2b) and extend upwardly and orthogonally (in parallel to the first long hole (2c)). Distance between the right-and-left pair of lancing parts (2d) are set to be substantially equal to width of the plate-like extending part (1b) of the base metal fitting (1), and the plate-like extending part (1b) of the base metal fitting (1) is held between the right-and-left pair of the lancing parts (2d), as discussed below.

The scale (2f) consists of several parallel linear slots which are extending in a length direction of the first plate-like part (2a) (perpendicular to the first long hole (2c)) between the right-and-left pair of the first long holes (2c). The scale (2f) can make it easy to visually confirm whether a bolt (13) to be inserted into the below-discussed right-and-left pair of the first long holes (2c) and a nut (14) screwed with the bolt (13) are at the same height.

The second plate-like part (2b) has a second long hole (2e) extending in parallel to the top surface of the roof.

The position-adjusting metal fitting is attached to the height-adjusting metal fitting (2) so that it can laterally slide, and consists of two types of metal fittings; a first position-adjusting metal fitting (3) arranged at an eaves edge side of the roof and a second position-adjusting metal fitting (4) arranged at the other side of the roof.

Figure 4:
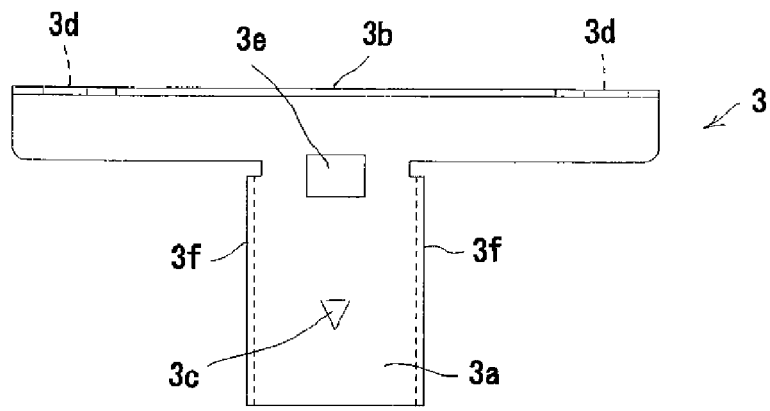
[FIG. 4] It shows a first position-adjusting metal fitting according to a solar battery module fixture of a first embodiment of the present invention. (a) is a plan view, (b) is a front view, and (c) is a right side view.
Figure 4:
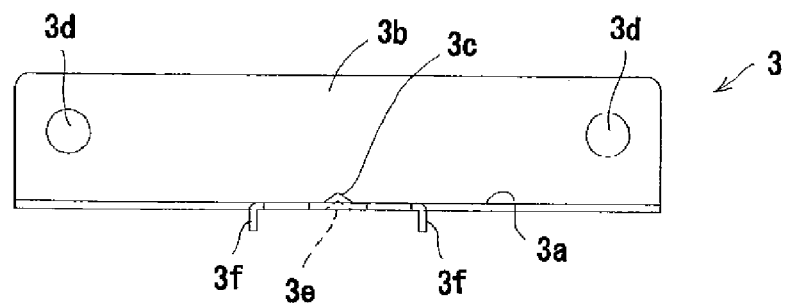
Figure 4:
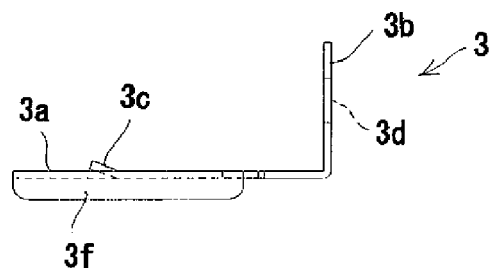

FIG. 4 shows the first position-adjusting metal fitting (3). (a) is a plan view, (b) is a front view, and (c) is a right side view.

The first position-adjusting metal fitting (3) comprises a mounting board part (3a) for placing a solar battery module, an eaves cover fixed part (3b) for fixing an eaves cover which covers the eaves edge side of the solar battery module, and a protrusion (3c) for ensuring electric connection with a frame by coming into contact with a conducting part of the frame provided around the solar battery module while the module is fixed.

The mounting board part (3a) forms a right angle with the eaves cover fixed part (3b) and the first position-adjusting metal fitting (3) as a whole is L-shape in a side view. The mounting board part (3a) is placed on the second plate-like part (2b) of the height-adjusting metal fitting (2) so as to be arranged in parallel to the top surface of the roof, and the eaves cover fixed part (3b) is arranged perpendicular to the top surface of the roof.

The mounting board part (3a) has a through hole (3e), the above-described protrusion (3c), and a guide part (3f).

The through hole (3e) is a rectangular hole for bolt insertion. The through hole (3e) is overlaid on the second long hole (2e) formed on the second plate-like part (2b) of the height-adjusting metal fitting (2) and then a bolt is inserted into these holes.

The protrusion (3c) is a triangular lancing part in a planar view and is protuberant so that one vertex of the triangle is higher than the other two vertices.

The guide parts (3f) are provided in pairs on both left and right sides so that they can be extending along a length direction of the mounting board part (3a), and are formed by downwardly folding width-directional both ends of the mounting board part (3a) at a right angle. Distance between the right-and-left pair of guide parts (3f) is set to be substantially equal to the width of the second plate-like part (2b) of the height-adjusting metal fitting (2). This allows the second plate-like part (2b) of the height-adjusting metal fittings (2) to be held between the right-and-left pair of guide parts (3f) at the time of below-discussed attachment, and enables the first position-adjusting metal fitting (3) to slide in parallel to the length direction of the second plate-like part (2b).

Through holes (3d) are provided on both ends of the eaves cover fixed part (3b) in a longitudinal direction. These through holes (3d) are provided for a bolt insertion to fix the eaves cover. A below-mentioned lower longitudinal part (5b) of the first fixing metal fittings (5) comes into contact with a surface between the two through holes (3d).

Figure 5:
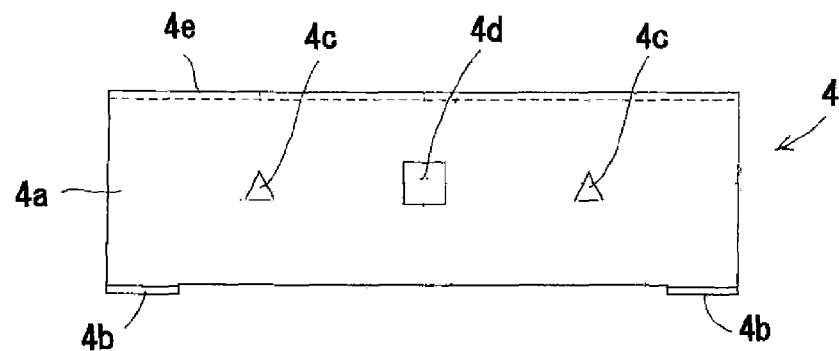
[FIG. 5] It shows a second position-adjusting metal fitting according to a solar battery module fixture of a first embodiment of the present invention. (a) is a plan view, (b) is a front view, and (c) is a right side view.
Figure 5:
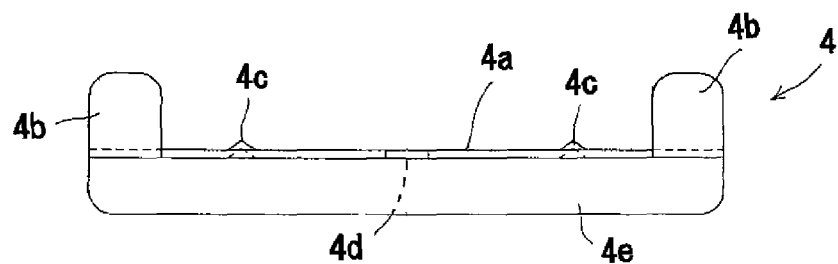
Figure 5:
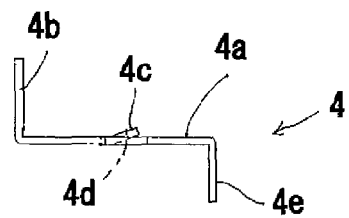

FIG. 5 illustrates a second position-adjusting metal fitting (4). (a) is a plan view, (b) is a front view, and (c) is a right side view.

The second position-adjusting metal fitting (4) comprises a mounting board part (4a) for placing the solar battery module, a stopper (4b) which can come into contact with an inner edge of a frame provided around the solar battery module when the solar battery module is placed on the mounting board part (4a), and a protrusion (4c) for ensuring electric connection with the frame by coming into contact with a conducting part of the frame while the solar battery module is fixed.

The mounting board part (4a) has through holes (4d) and above-mentioned protrusions (4c).

The through hole (4d) is provided for a bolt insertion and in a square-like shape. The through hole (4d) is overlaid on the second long hole (2e) formed on the second plate-like part (2b) of the height-adjusting metal fitting (2) and then a bolt is inserted into these holes.

The protrusion (4c) is a triangular lancing part in a planar view and is protuberant so that one vertex of the triangle is higher than the other two vertices. The protrusions (4c) are provided on two spots facing each other across the through holes (4d).

The second position-adjusting metal fitting (4) has two stoppers (4b) arranged with some space therebetween. The stoppers (4b) are provided on both ends in a longitudinal direction of the mounting board part (4a) and formed so that one end in a short direction of the mounting board part (4a) is bent upwardly at right angle.

While, the other end in a short direction of the mounting board part (4a) has a dropping board part (4e) bent downwardly at right angle along an entire length in a longitudinal direction of the mounting board part (4a).

The fixing metal fitting is attached to the position-adjusting metal fittings (3) and (4) and fixed so as to vertically hold the solar battery module with the position-adjusting metal fittings (3) and (4).

The fixing metal fitting consists of two kinds of metal fittings; a first fixing metal fitting (5) which is arranged at ends of one or more solar battery modules (hereinafter called as a solar battery module unit) arranged on a roof, and a second fixing metal fitting (6) arranged at parts other than the ends of the solar battery module unit (among a plurality of solar battery modules).

Figure 6:
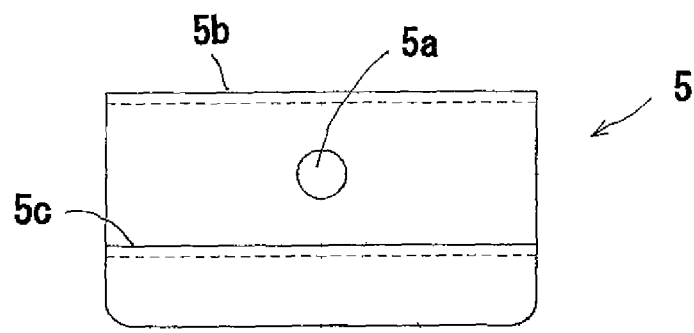
[FIG. 6] It shows a first fixing metal fitting according to a solar battery module fixture of a first embodiment of the present invention. (a) is a plan view, (b) is a front view, and (c) is a right side view.
Figure 6:
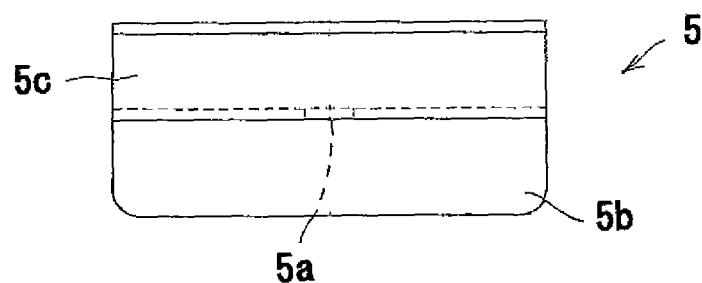
Figure 6:
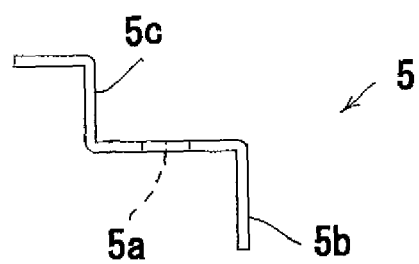

FIG. 6 illustrates a first fixing metal fitting (5). (a) is a plan view, (b) is a front view, and (c) is a right side view.

The first fixing metal fitting (5) is formed by folding a flat plate in a staircase pattern so that said flat plate can have two lateral parts and two longitudinal parts.

A lower lateral part of two-tiered lateral parts have a through hole (5a). The through hole (5a) is provided for the bolt insertion, and overlaid on the through hole (3e) of the first position-adjusting metal fitting (3) or the through hole (4d) of the second position-adjusting metal fitting (4), and then a bolt is inserted into these holes and fixed with a nut.

A lower longitudinal part (5b) of two-tiered longitudinal parts comes into contact with an inner surface of the eaves cover fixed part (3b) (a surface arranged on an opposite side of the eaves edge), in a surface between the two through holes (3d) of the eaves cover fixed part (3b) of the first position-adjusting metal fitting (3). An upper longitudinal direction part (5c) comes into contact with the outer edge part of the frame of the solar battery module. Since the upper longitudinal direction part (5c) and the lower longitudinal direction part (5b) are formed in parallel, it becomes possible to attach an eaves cover and a solar battery module in parallel as described later.

Figure 7:
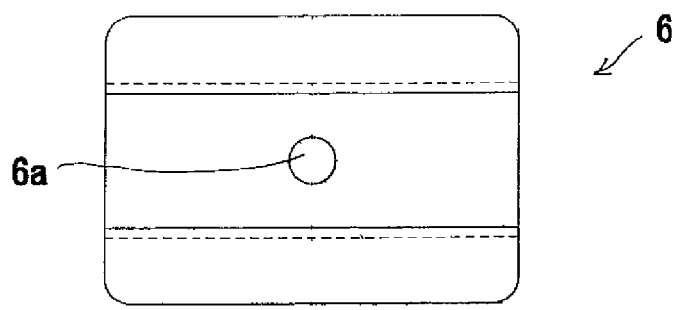
[FIG. 7] It shows a second fixing metal fitting according to a solar battery module fixture of a first embodiment of the present invention. (a) is a plan view, (b) is a front view, and (c) is a right side view.
Figure 7:
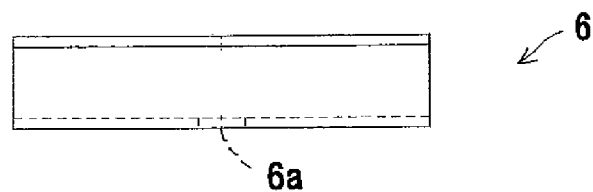
Figure 7:
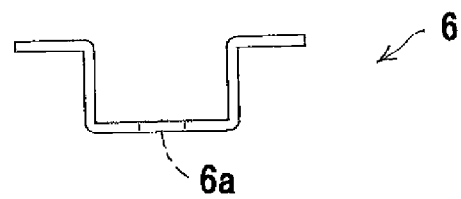

FIG. 7 illustrates a second fixing metal fitting (6). (a) is a plan view, (b) is a front view, and (c) is a right side view.

The second fixing metal fitting (6) is in a shape in which a board is formed in a concave-shape and left and right top ends of the board is bent in a rectangular direction and to opposite sides of each other.

A through hole (6a) is provided on a bottom board part of the second fixing metal fitting (6). The through hole (6a) is provided for the bolt insertion, and overlaid on a through hole (4d) of the second position-adjusting metal fitting (4), and a bolt is inserted into these holes and fixed with a nut.

Hereinafter, a method to fix a solar battery module on a slate roof using a solar battery module fixture according to the first embodiment of the present invention will be set forth.

Figure 8:
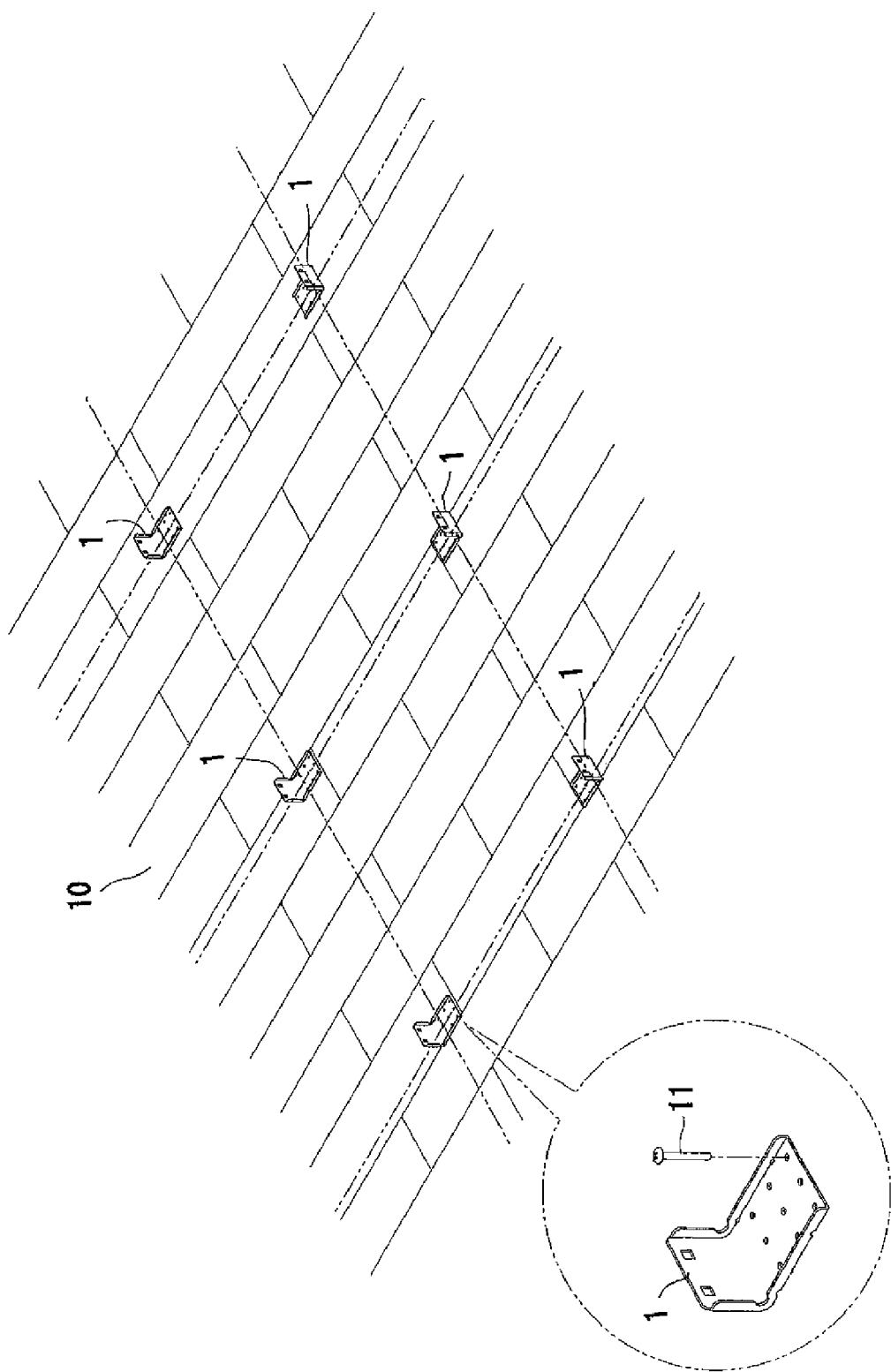
[FIG. 8] It shows a base metal fitting fixed on a roof according to a solar battery module fixture of a first embodiment of the present invention.

First, a plurality of the base metal fittings (1) (six pieces in an example of the drawing) corresponding to the size and the number of solar battery modules fixed on the roof are fixed on a roof (10) with screws (11) (see FIG. 8). At this time, a plate-like fixed part (1a) of the base metal fittings (1) is kept from striding over a level difference (joint of a tile) (12) of the roof (10).

In addition, although the base metal fittings shown in FIG. 1 are used in the example of the figure, the modified base metal fittings shown in FIG. 2 may be used.

Figure 9:
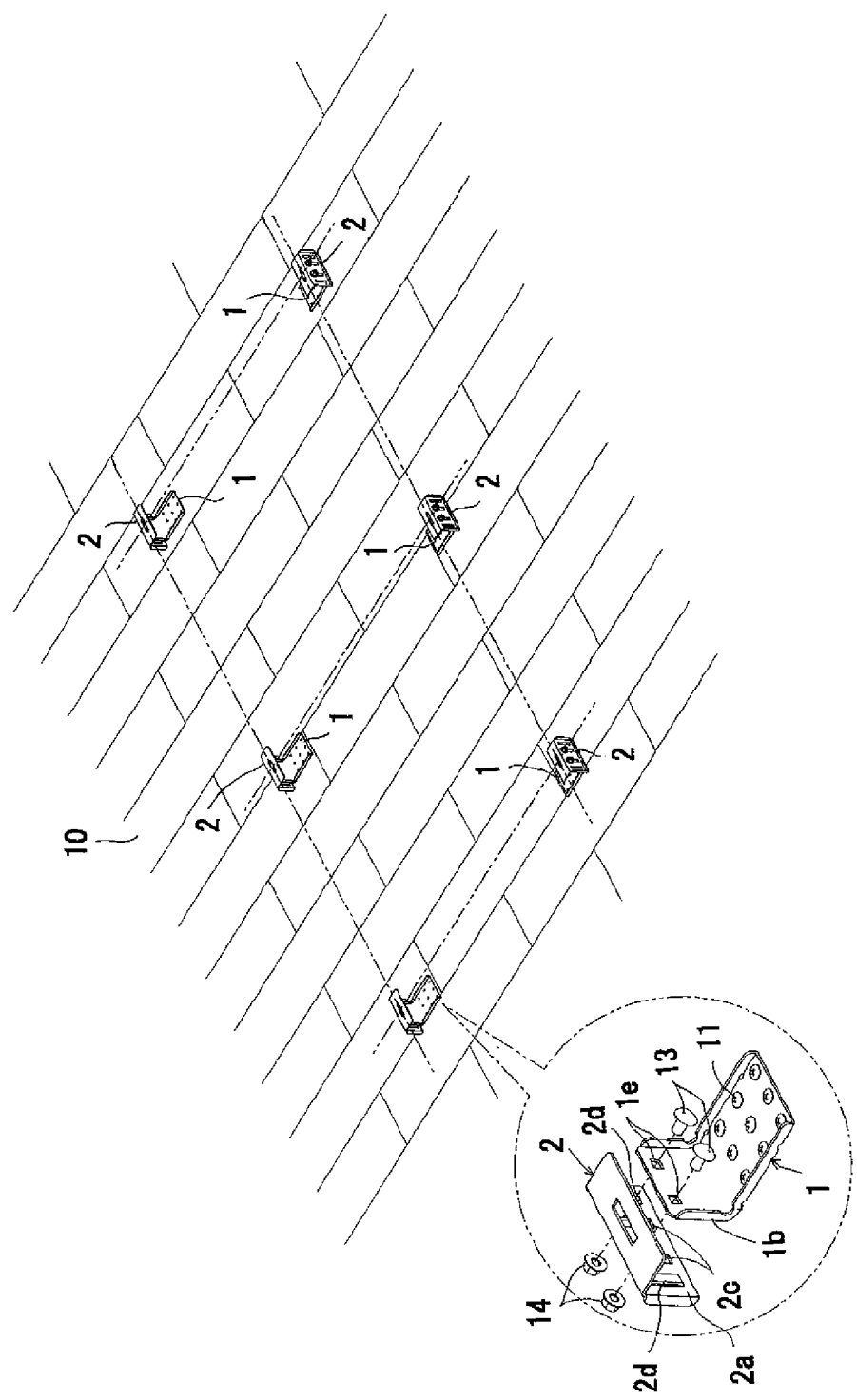
[FIG. 9] It shows a height-adjusting metal fitting attached to a base metal fitting according to a solar battery module fixture of a first embodiment of the present invention.

Subsequently, height-adjusting metal fittings (2) are attached to the base metal fittings (1) (see FIG. 9).

As shown in an enlarged view within a circle, this attachment is performed by overlaying the first long hole (2c) formed on the first plate-like part (2a) of the height-adjusting metal fitting (2) on the through hole (1e) formed on the plate-like extending part (1b) of the base metal fitting (1), and inserting bolts (13) in the overlaid part to fasten by a nut (14). Thereby, it becomes possible to make the height-adjusting metal fitting (2) slide to a longitudinal direction along the first long hole (2c).

At this time, the plate-like extending part (1b) of the base metal fitting (1) is held between the left-right pair of the lancing parts (2d) of the first plate-like part (2a) of the height-adjusting metal fitting (2). Thereby, when the height-adjusting metal fitting (2) slides in a longitudinal direction to the base metal fitting (1), the lancing parts (2d) play a role of a guide and the height-adjusting metal fitting (2) slides smoothly without inclining diagonally.

Figure 10:
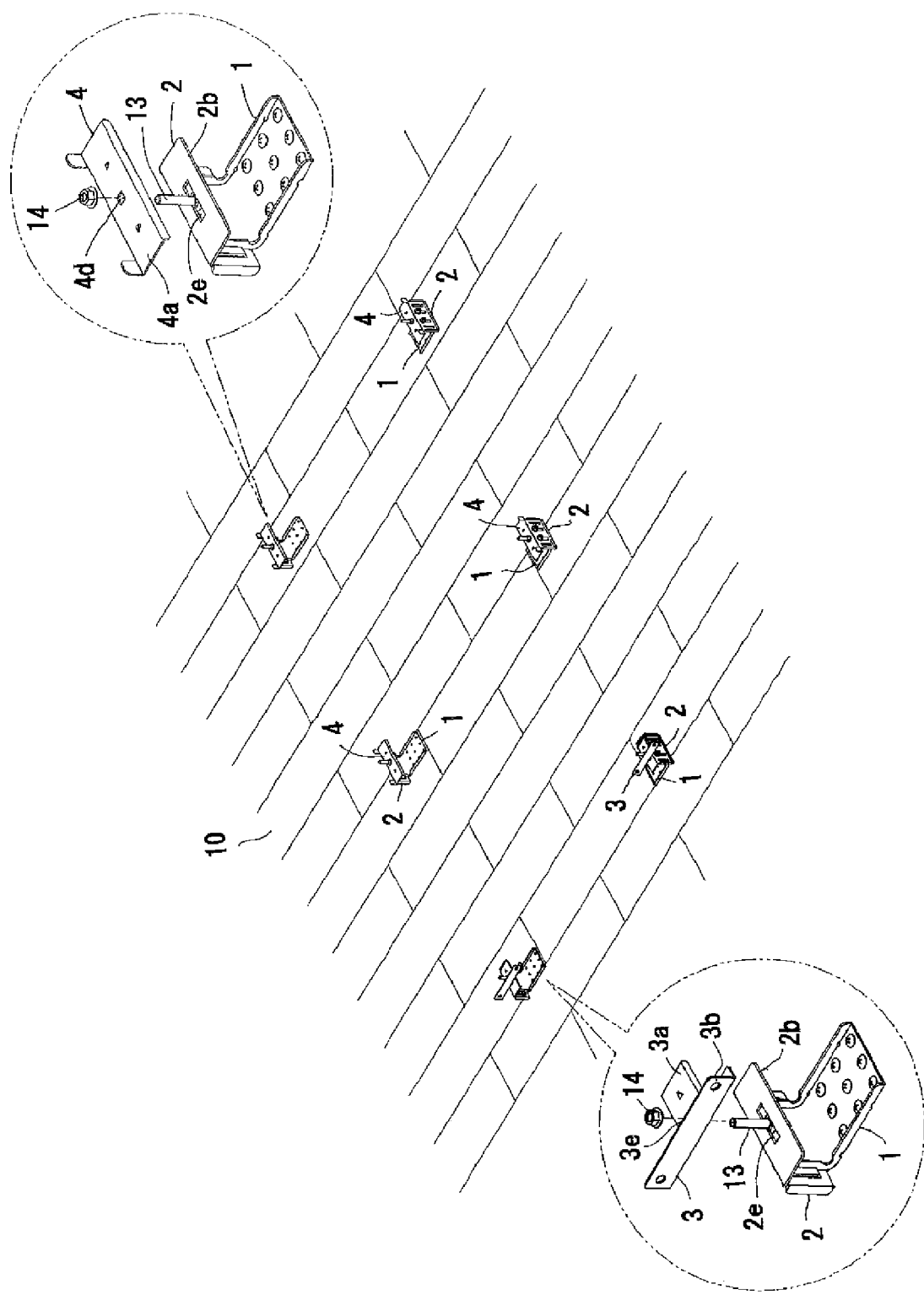
[FIG. 10] It shows a position-adjusting metal fitting attached to a height-adjusting metal fitting according to a solar battery module fixture of a first embodiment of the present invention.

Next, a position-adjusting metal fitting is attached to the height-adjusting metal fitting (2) (see FIG. 10).

Specifically, a first position-adjusting metal fitting (3) is attached to the height-adjusting metal fitting (2) arranged on eaves edge side of a roof, and a second position-adjusting metal fitting (4) is attached to the height-adjusting metal fitting (2) arranged on other sides of the roof.

As shown in an enlarged view within a lower left circle, the attachment of the height-adjusting metal fitting (2) and the first position-adjusting metal fitting (3) is performed by overlaying the through hole (3e) formed on the mounting board part (3a) of the first position-adjusting metal fitting (3) on the second long hole (2e) formed on the second plate-like part (2b) of the height-adjusting metal fitting (2), and inserting a bolt (13) in the overlaid part to screw a nut (14). Thereby, it becomes possible to make the first position-adjusting metal fitting (3) slide to a lateral direction integrally with the height-adjusting metal fitting (2) along the second long hole (2e).

The first position-adjusting metal fitting (3) in the attached state is oriented such that the eaves cover fixed part (3b) extends in parallel to the eaves edge, as shown in the drawing.

As shown in an enlarged view within an upper right circle, the attachment of the height-adjusting metal fitting (2) and the second position-adjusting metal fitting (4) is performed by overlaying the through hole (4d) formed on the mounting board part (4a) of the second position-adjusting metal fitting (4) on the second long hole (2e) formed on the second plate-like part (2b) of the height-adjusting metal fitting (2), and inserting a bolt (13) in the overlaid part to screw a nut (14). Thereby, it becomes possible to make the second position-adjusting metal fitting (4) slide to a lateral direction along the second long hole (2e).

The second position-adjusting metal fitting (4) in the attached state is oriented such that the two stoppers (4b) are in parallel to an inclining direction of a roof, as shown in the drawing.

Figure 11:
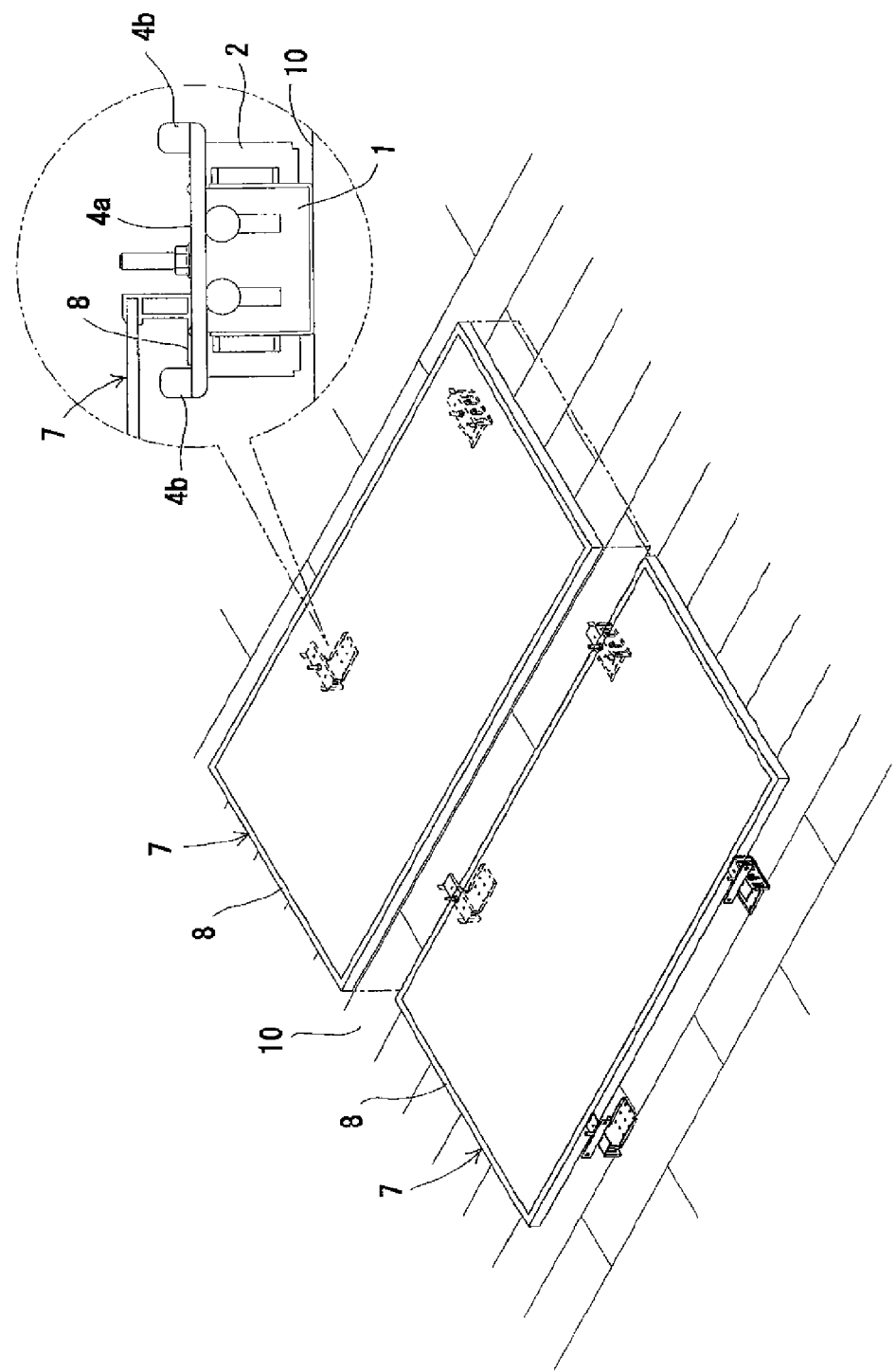
[FIG. 11] It shows a temporarily-placed solar battery module according to a solar battery module fixture of a first embodiment of the present invention.

After the base metal fitting (1), height-adjusting metal fitting (2), the first position-adjusting metal fitting (3), and the second position-adjusting metal fitting (4) are attached through the above-mentioned work steps, a solar battery module (7) is temporarily placed (see FIG. 11).

When the solar battery module (7) is temporarily placed, it is mounted on the mounting board part (3a) of the first position-adjusting metal fitting (3) and the mounting board part (4a) of the second position-adjusting metal fitting (4).

At this time, as shown in an enlarged view within a circle, an inner edge of metal frames (8) attached around the solar battery module (7) come into contact with the stopper (4b) of the second position-adjusting metal fitting (4). Additionally, on the second position-adjusting metal fitting (4) arranged between the two solar battery modules (7), inner edges of the frames (8) of the different solar battery modules (7) abut to two stoppers (4b), respectively (see FIG. 15).

This prevents the solar battery modules (7) from slipping from the roof when it is temporarily placed.

Figure 12:
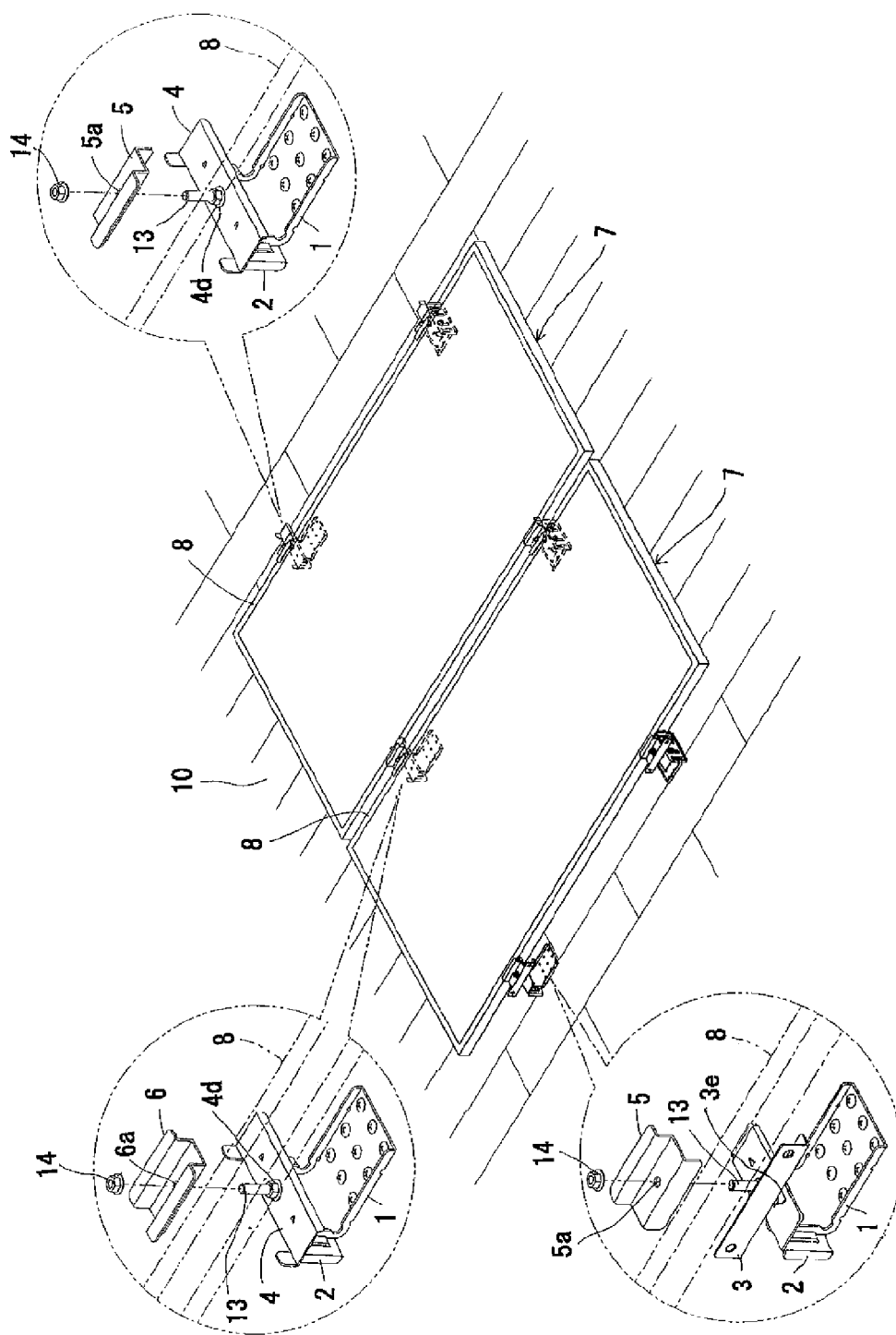
[FIG. 12] It shows a first fixing metal fitting and a second fixing metal fitting attached to a first position-adjusting metal fitting or a second position-adjusting metal fitting according to a solar battery module fixture of a first embodiment of the present invention.

After the solar battery module (7) is temporarily placed, the first fixing metal fitting (5) and the second fixing metal fitting (6) are attached to the first position-adjusting metal fitting (3) or the second position-adjusting metal fitting (4) (see FIG. 12).

As we mentioned above, the first fixing metal fitting (5) is arranged at the end of the solar battery module unit and the second fixing metal fitting (6) is arranged at parts other than the end of the solar battery module unit (among a plurality of solar battery modules).

The attachment of the first fixing metal fitting (5) to the first position-adjusting metal fitting (3) is performed by overlaying the through hole (3e) of the first position-adjusting metal fitting (3) on the through holes (5a) of the first fixing metal fitting (5) and inserting a bolt (13) in the overlaid part to screw a nut (14) (see an enlarged view within a lower left circle).

The attachment of the first fixing metal fitting (5) to the second position-adjusting metal fitting (4) is performed by overlaying the through holes (4d) of the second position-adjusting metal fitting (4) on the through holes (5a) of the first fixing metal fitting (5), and inserting a bolt (13) in the overlaid part to screw a nut (14) (see an enlarged view within an upper right circle).

The attachment to the second position-adjusting metal fitting (4) of the second fixing metal fitting (6) is performed by overlaying the through holes (4d) of the second position-adjusting metal fitting (4) on the through hole (6a) of the second fixing metal fitting (6), and inserting a bolt (13) in the overlaid part to screw a nut (14) (see an enlarged view within an upper left circle).

Figure 13:
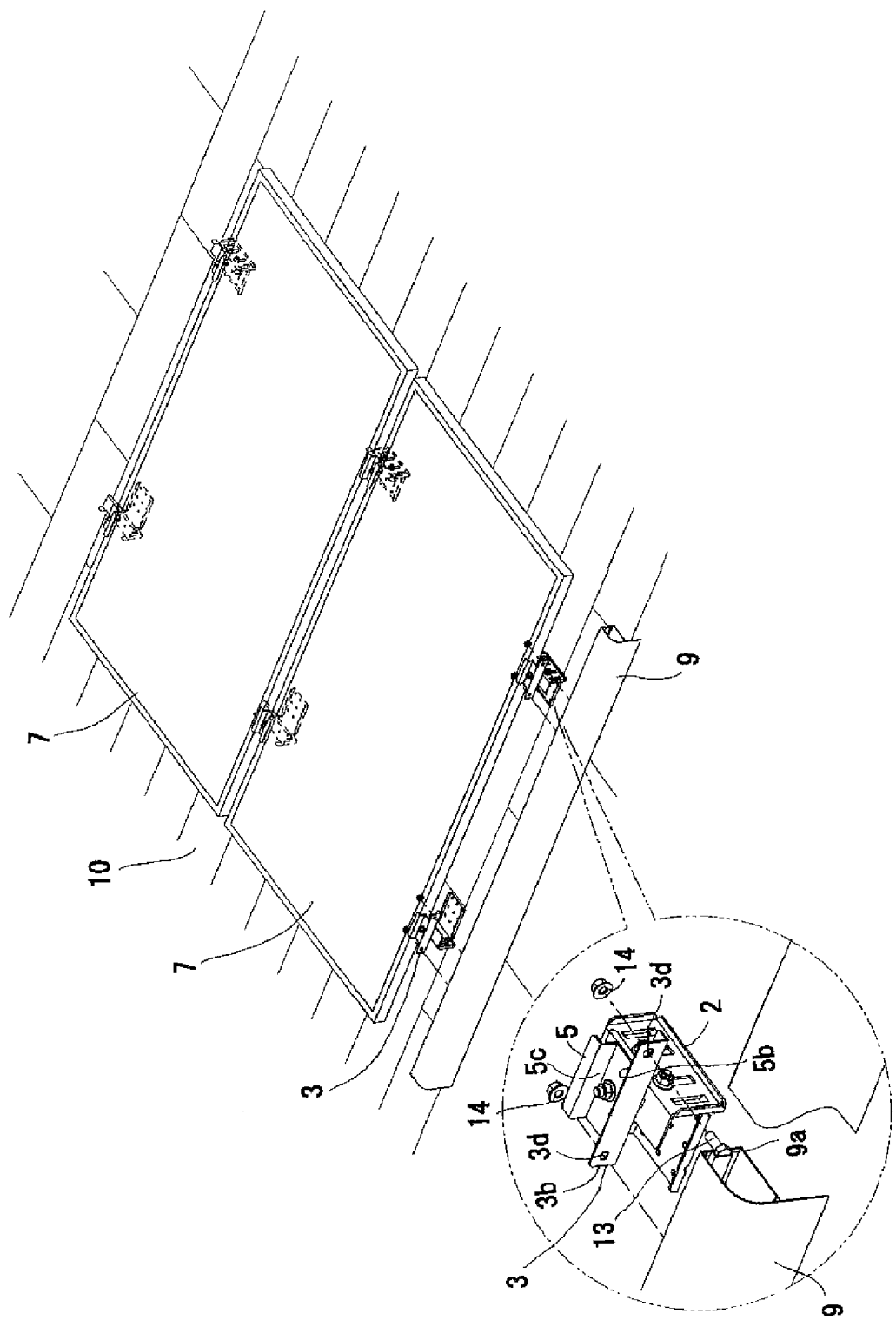
[FIG. 13] It shows that an eaves cover is attached to an eaves cover fixed part of a first position-adjusting metal fitting according to a solar battery module fixture of a first embodiment of the present invention.

Finally, an eaves cover (9) is attached to the eaves cover fixed part (3b) of the first position-adjusting metal fitting (3) with a bolt (13) and a nut (14) (see FIG. 13).

This attachment is performed by fitting a head of the bolt (13) into a slot (9a) formed on a rear surface of the eaves cover (9) along an eaves cover direction, and inserting a thread part of the bolt (13) in the through holes (3d) of the eaves cover (9) to screw the nut (14). Thereby, the eaves cover (9) is attached so as to be slidable in the direction of its length.

Here, in the first fixing metal fitting (5), the lower longitudinal direction part (5b) come into contact with an outer surface (surface arranged on the opposite side to the eaves edge) between the through holes (3d) of the eaves cover fixed part (3b) and the upper longitudinal direction part (5c) come into contact with the outer edge part of the frame of the solar battery module (7). Since the upper longitudinal direction part (5c) and the lower longitudinal direction part (5b) are formed in parallel with each other, it becomes possible to attach the eaves cover (9) and the solar battery module (7) in parallel with each other. That is, the lower longitudinal direction part (5b) of the first fixing metal fitting (5) functions to position the eaves cover (9).

Figure 14:
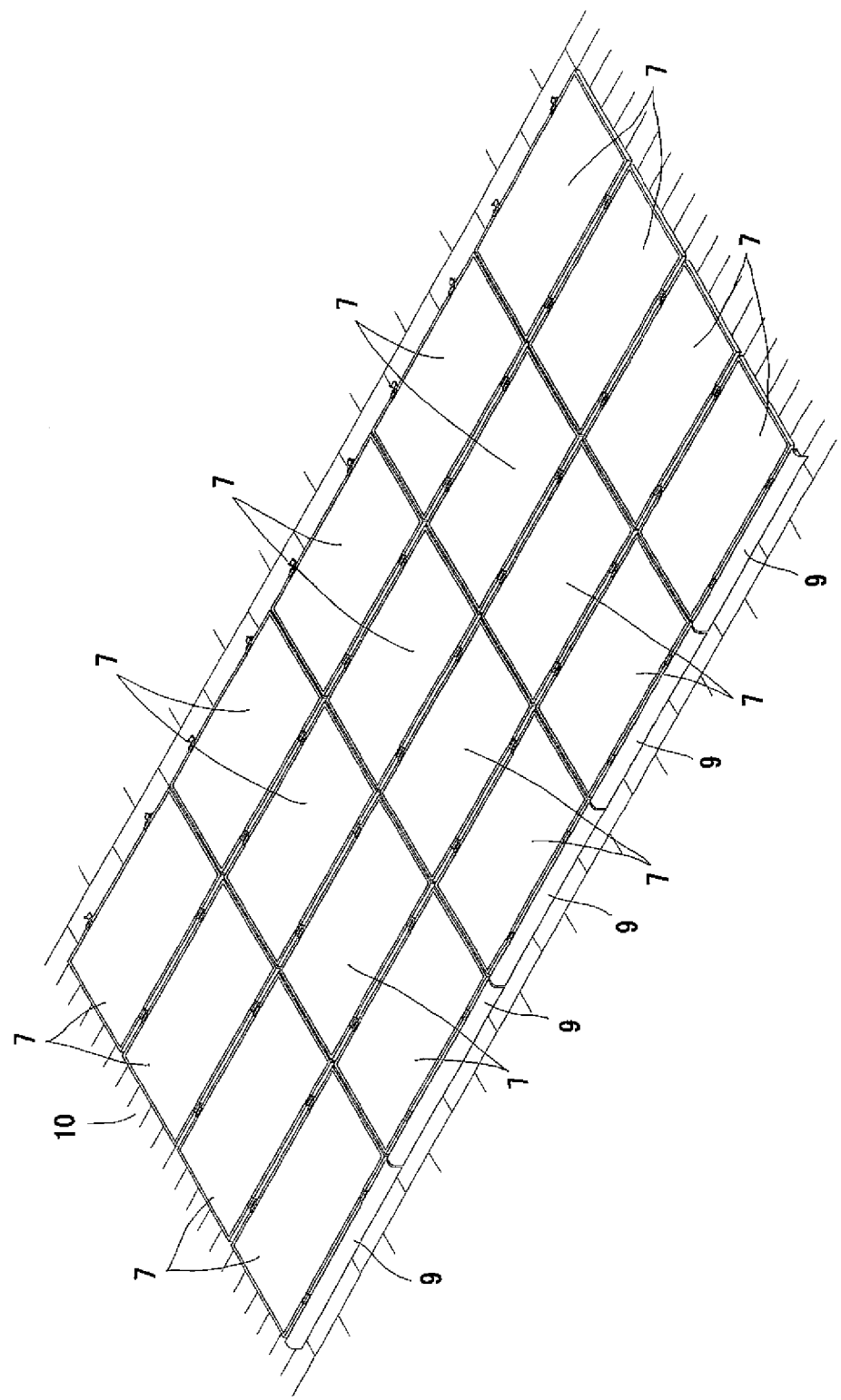
[FIG. 14] It shows that a solar battery module is completely fixed on a slate roof according to the solar battery module fixture of a first embodiment of the present invention.

Through the above-mentioned work steps, the solar battery module (7) is fixed on the slate roof (10) (see FIG. 14).

Figure 15:
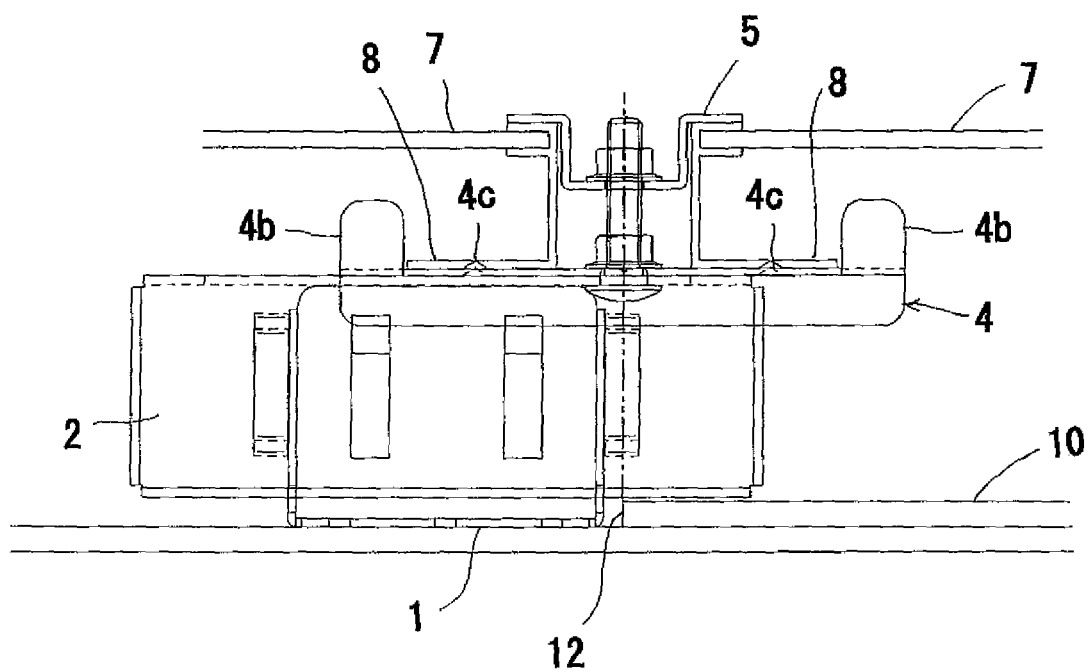
[FIG. 15] It shows a cross sectional view of a solar battery module fixed on a slate roof in a solar battery module fixture of the first embodiment of the present invention.

FIG. 15 is a cross sectional view of the solar battery module (7) fixed on the slate roof (10).

According to the solar battery module fixture associated with the present invention, as shown in FIG. 15, when the solar battery module (7) must be fixed on a level difference (joint of slate tile) part (12) of a slate roof (see two-dot chain line), the base metal fitting (1) is fixed as not to stride over the level difference (12) of the roof (10). And the second position-adjusting metal fitting (4) (or the first position-adjusting metal fitting (3)) may be slid in an upward direction and level difference direction (right direction in FIG. 15). Consequently, the solar battery module (7) can be fixed to a suitable position without being affected by the level difference (i.e., avoiding level differences).

Moreover, the solar battery module (7) is fixed by the second fixing metal fitting (5) (and the first fixing metal fitting (6)) with the inner edge of the frame (8) coming into contact with the stoppers (4b) of the second position-adjusting metal fitting (4). Therefore, even if one side of the fixing metal fitting fixing both sides of the frame comes off, the solar battery module (7) is prevented from coming off.

Furthermore, a lower surface of the frame (8) of the solar battery module (7) is pressed against the protrusions (4c) of the second position-adjusting metal fitting (4) (and the protrusions (3c) of the first position-adjusting metal fitting (3)) by the second fixing metal fitting (5) (and the first fixing metal fitting (6)). Thereby, a coating of the frame (8) is damaged by the protrusions (4c) (and the protrusions (3c)), the conducting part (metal part) of the frame (8) is exposed, and the electrical connection of the conducting part with the second position-adjusting metal fitting (4) (and the first position-adjusting metal fitting (3)) is secured. This allows an ground processing without specifically preparing a metal fitting for the ground processing, if a ground wire is connected to the second position-adjusting metal fitting (4) (and the first position-adjusting metal fitting (3)).

Since the stoppers (4b) and the protrusions (4c) are provided on the second position-adjusting metal fitting (4), they slide integrally with the second position-adjusting metal fitting (4) in adjusting a position of the solar battery module (7). Therefore, when the fixed position of the solar battery module is adjusted, slip prevention function for the temporarily-placed solar battery module and ground processing function can be fulfilled, too.

Next, a second embodiment of the solar battery module fixture associated with the present invention will be set forth.

Figure 16:
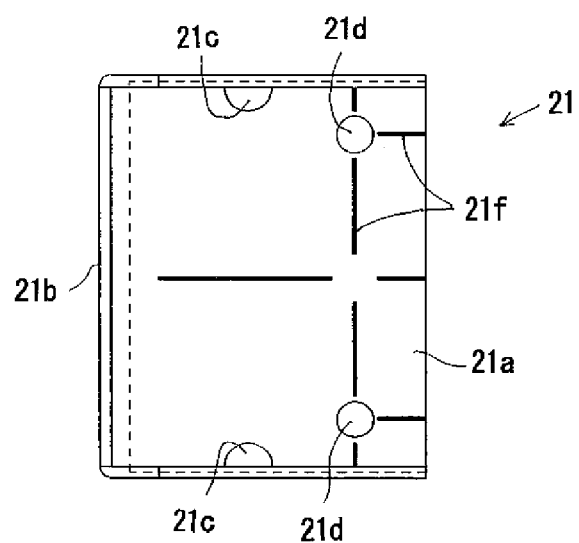
[FIG. 16] It shows a base metal fitting according to a solar battery module fixture of a second embodiment of the present invention. (a) is a plan view, (b) is a front view, and (c) is a right side view.
Figure 16:
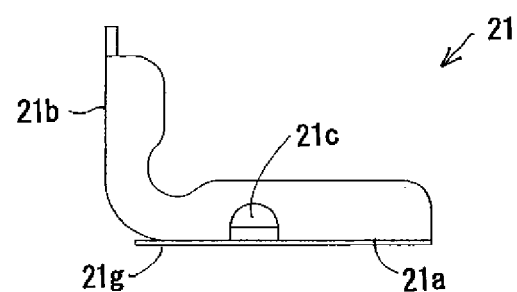
Figure 16:
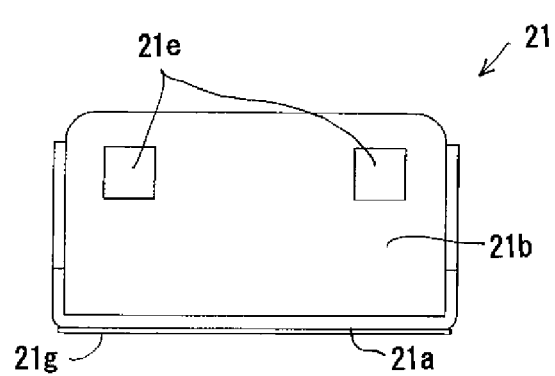

FIG. 16 illustrates a base metal fitting (21). (a) is a plan view, (b) is a front view, and (c) is a right side view.

The base metal fitting (21) is a metal fitting fixed on a top surface of the slate roof, consists of a plate-like fixed part fixedly coming into contact with the top surface of the roof and a plate-like extending part (21b) arranged longitudinally on the top surface of the roof, and is as a whole bent in a L-shape in a front view.

A plurality of the through holes (21c) and (21d) (two holes in an example of the drawing) are formed on the plate-like fixed part (21a). Although the number of through holes (21c) and (21d) is not specifically limited, in the example of FIG. 16, two through holes (21c) and two through holes (21d) are formed. Among these through holes (21c) and (21d), the through holes (21c) formed on both ends in a width direction of the plate-like fixed part (21a) are used as weep holes, and the remaining through holes (21d) are used as holes for an insertion of screws to fix the base metal fitting (21) to the top surface of the roof.

A plurality of the through holes (21e) (two holes in the example of the drawing) are formed on the plate-like extending part (21b). The through holes (21e) are in a square-like shape and provided side by side in a width direction of the plate-like extending part (21b).

Lines (21f) used as marks for adjusting positions of the through holes (21d), etc., to the predetermined positions on the roof are drawn on the top surface of the plate-like fixed part (21a). A two-sided adhesive tape (21g) is stuck on a lower surface of the plate-like fixed part (21a).

Figure 17:
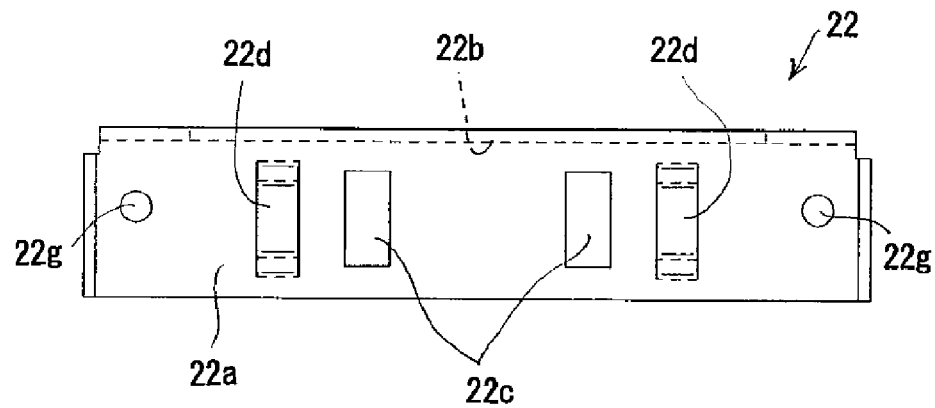
[FIG. 17] It shows a height-adjusting metal fitting according to a solar battery module fixture of a second embodiment of the present invention. (a) is a front view, (b) is a bottom view, and (c) is a right side view.
Figure 17:
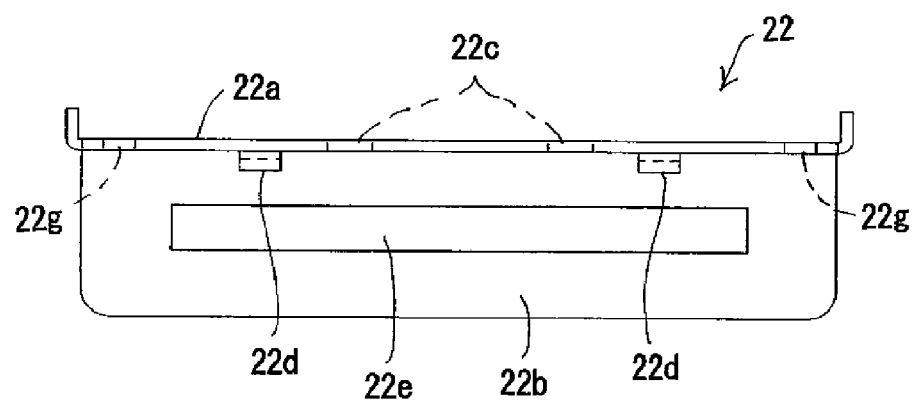
Figure 17:
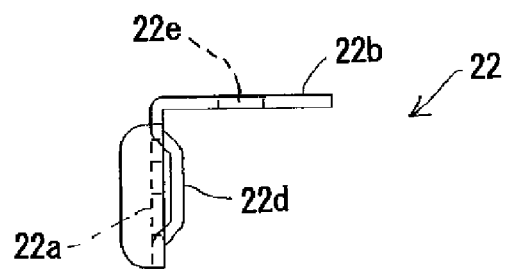

FIG. 17 illustrates a height-adjusting metal fitting (22). (a) is a front view, (b) is a bottom view, and (c) is a right side view.

The height-adjusting metal fitting (22) is a metal fitting attached slidable in a longitudinal direction to the base metal fitting (21), consists of a first plate-like part (22a) arranged in a longitudinal direction to the top surface of the roof and a second plate-like part (22b) arranged in a direction parallel to the top surface of the roof, and is as a whole bent in a L-shape in a side view.

A first long hole (22c), lancing parts (22d), and small holes (22g) are formed on the first plate-like part (22a).

A plurality of first long holes (22c) (two holes in the example of FIG. 17) are formed in parallel with each other so as to extend in a longitudinal direction to the top surface of the roof.

The lancing parts (22d) are formed in pair on the left and right sides of the first plate-like part (22a) so as to protrude toward an extending direction of the second plate-like part (22b) and extend toward an upwardly rectangular direction (a direction parallel to the first long hole (22c)). A distance between the left-right pair of lancing parts (22d) of the first plate-like part (22a) is set to be substantially equal to a width of the plate-like extending part (21b) of the base metal fitting (21), and the plate-like extending part (21b) of the base metal fitting (21) is held between the left-right pair of lancing parts (22d) of the first plate-like part (22a), as described later.

Figure 27:
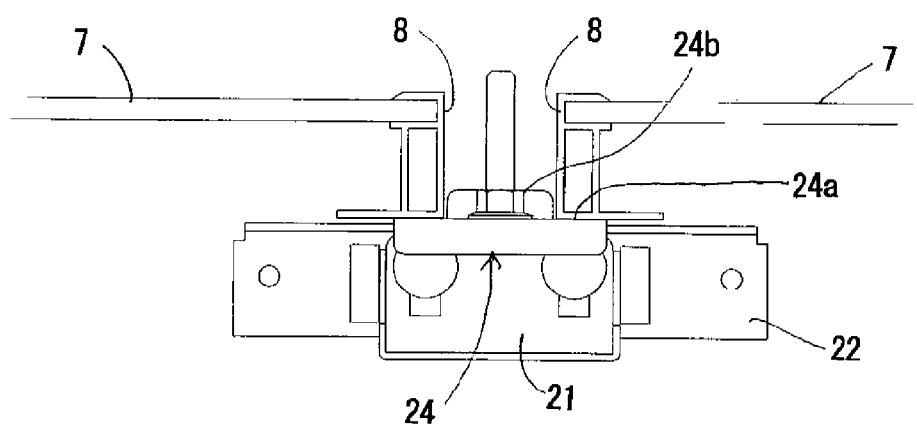
[FIG. 27] It shows how to attach the solar battery module according to the solar battery module fixture of a second embodiment of the present invention.
Figure 27:
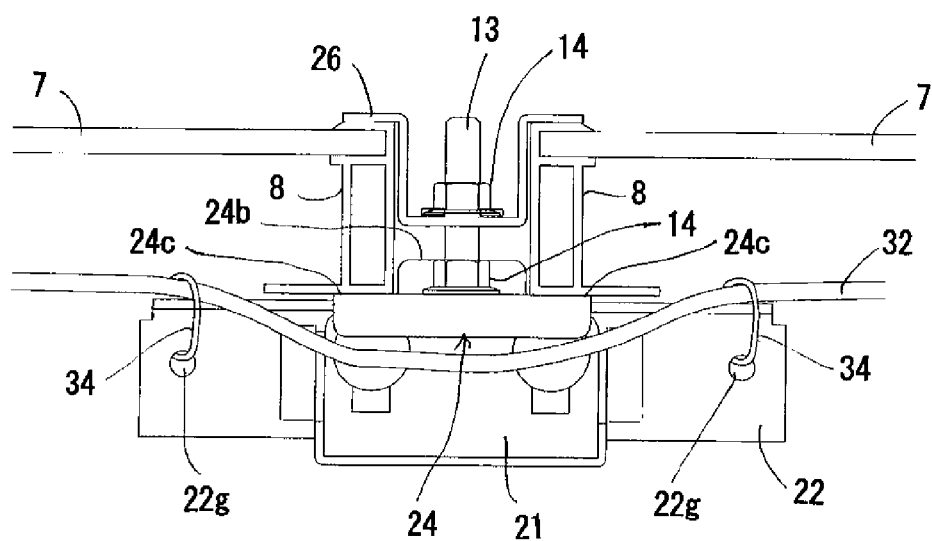

The small holes (22g) are provided in the vicinity of both ends in a length direction of the first plate-like part (22a), and used for an insertion of a binding band to fix a distributing cable connected to the solar battery module, as described later (see FIG. 27 (b)).

The second long hole (22e) extending in a direction parallel to the top surface of the roof is formed on the second plate-like part (22b).

Figure 18:
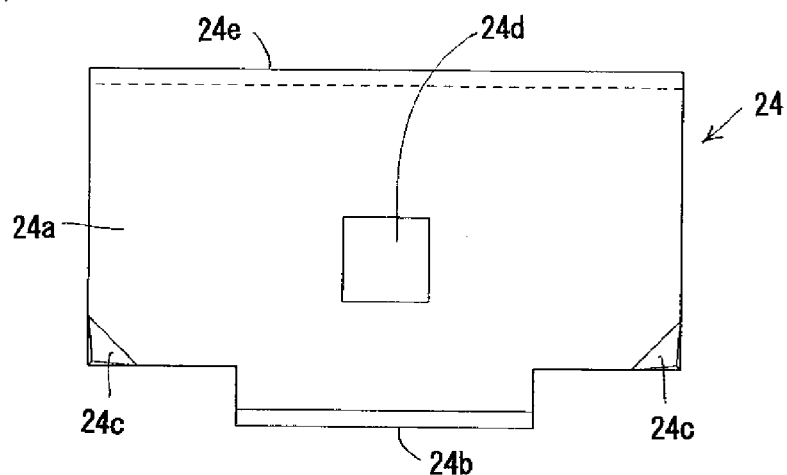
[FIG. 18] It shows a common position-adjusting metal fitting according to a solar battery module fixture of a second embodiment of the present invention. (a) is a plan view, (b) is a front view, and (c) is a right side view.
Figure 18:
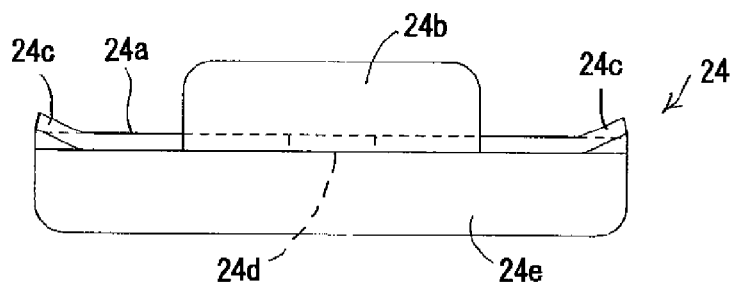
Figure 18:
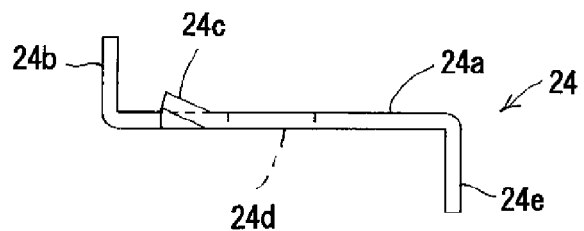

A position-adjusting metal fitting is a metal fitting attached to the height-adjusting metal fitting (22) so that it can slide laterally, consists of a common position-adjusting metal fitting (24) with a shape which can be arranged both on eaves side and the other sides of the roof (see FIG. 18). That is, although, in the above-mentioned first embodiment, the position-adjusting metal fitting consists of two kinds of metal fittings; a first position-adjusting metal fitting (3) arranged at the eaves side of the roof and a second position-adjusting metal fitting (4) arranged at the other sides of the roof, the position-adjusting metal fitting consists only one kind of metal fitting in this second embodiment.

FIG. 18 illustrates a common position-adjusting metal fitting (24). (a) is a plan view, (b) is a front view, and (c) is a right side view.

The common position-adjusting metal fitting (24) comprises a mounting board part (24a) for placing the solar battery module, a stopper (24b) which can come into contact with an outer edge of a frame provided around the solar battery module when the solar battery module is placed on the mounting board part (24a), and a protrusion (24c) for ensuring electric connection with the frame by coming into contact with a conducting part of the frame while the solar battery module is fixed.

A through hole (24d) and the above-mentioned protrusions (24c) are provided on the mounting board part (24a).

The through hole (24d) is provided for an insertion of a bolt and in a square-like shape.

The through hole (24d) is overlaid on the second long hole (22e) formed in the second plate-like part (22b) of the height-adjusting metal fitting (22), and a bolt is inserted into these holes.

The protrusions (24c) are lancing parts in triangle shape in planar view and formed so that two angles of the mounting board part (24a) are bent diagonally upward. The protrusions (24c) are provided on two spots facing each other across the through hole (24d).

The common position-adjusting metal fitting (24) has one stopper (24b).

The stopper (24b) is provided on a central part in a longitudinal direction of the mounting board part (24a) and formed so that one end in a short direction of the mounting board part (24a) is bent upwardly at right angle.

While, a dropping board part (24e) bent downwardly at right angle along an entire length in a longitudinal direction of the mounting board part (24a) is formed on the other end in a short direction of the mounting board part (24a).

A fixing metal fitting is attached to the common position-adjusting metal fitting (24), and fixes the solar battery module by vertically holding it between common position-adjusting metal fittings (24).

The fixing metal fitting consists of two kinds of metal fittings; a first fixing metal fitting (25) arranged at the end of the solar battery module unit and a second fixing metal fitting (26) arranged at parts other than the end of the solar battery module unit (among a plurality of solar battery modules).

Figure 19:
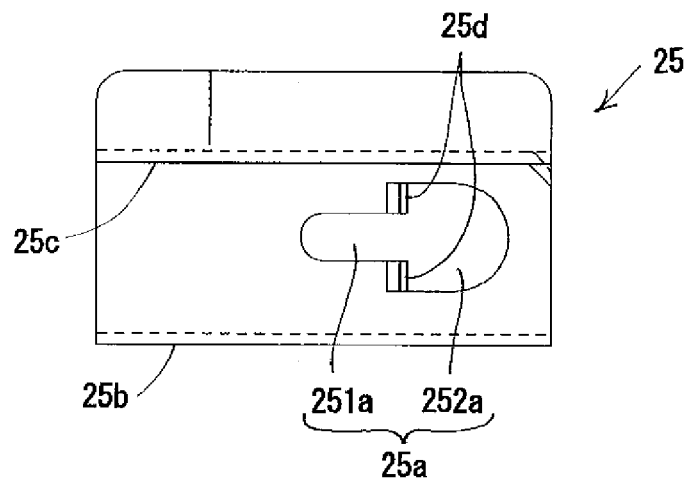
[FIG. 19] It shows a first fixing metal fitting according to a solar battery module fixture of a second embodiment of the present invention. (a) is a plan view, (b) is a front view, and (c) is a right side view.
Figure 19:
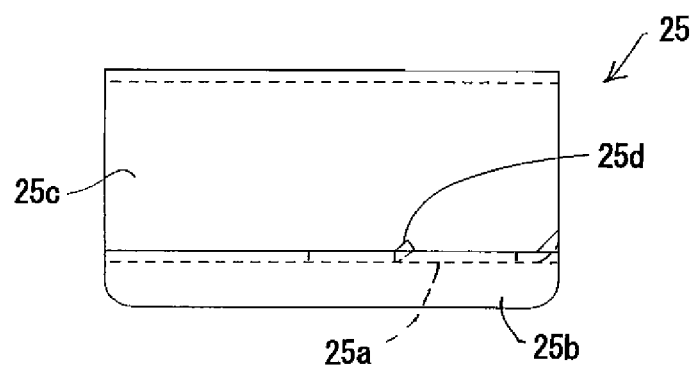
Figure 19:
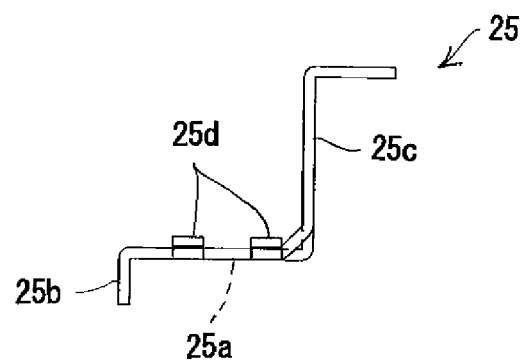

FIG. 19 illustrates a first fixing metal fitting (25). (a) is a plan view, (b) is a front view, and (c) is a right side view.

The first fixing metal fitting (25) is formed by folding a flat plate in a staircase pattern so that said flat plate can have two lateral parts and two longitudinal parts.

A lower lateral part of two-tiered lateral parts have a through hole (25*a*). The through hole (25*a*) is provided for the bolt insertion, and arranged on the through hole (24*d*) of the common position-adjusting metal fitting (24), and then a bolt is inserted into these holes and fixed with a nut.

The through hole (25*a*) is formed in a substantially mushroom shape in planar view by connecting a narrow width part (251*a*) whose width is narrower than that of a nut screwed with said bolt and a wide width part (252*a*) whose width is wider than that of said nut. Thereby, as described later, when the first fixing metal fitting (25) is arranged and attached on the common position-adjusting metal fitting (24), it becomes possible to attach the first fixing metal fitting (25) without removing a nut for a fixation of the first fixing metal fitting (25), so that construction efficiency can be improved (see FIGS. 29 (*a*) and (*b*)).

A bent protrusion (25*d*) is formed on an edge of the wide width part (252*a*). This bent protrusion (25*d*) has a function to prevent a movement of a nut used when the first fixing metal fitting (25) is arranged and attached on the common position-adjusting metal fitting (24).

An upper longitudinal direction part (25*c*) of two-tiered longitudinal direction parts can come into contact with an outer edge part of a frame (8) of the solar battery module (7).

Figure 20:
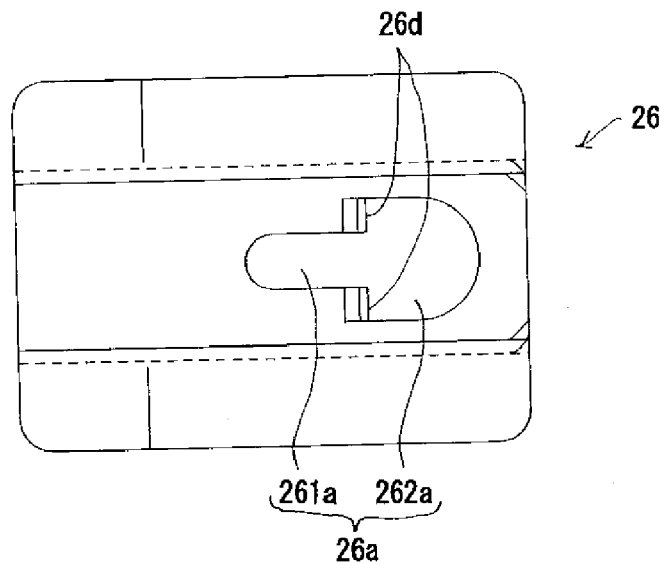
[FIG. 20] It shows a second fixing metal fitting according to a solar battery module fixture of a second embodiment of the present invention. (a) is a plan view, (b) is a front view, and (c) is a right side view.
Figure 20:
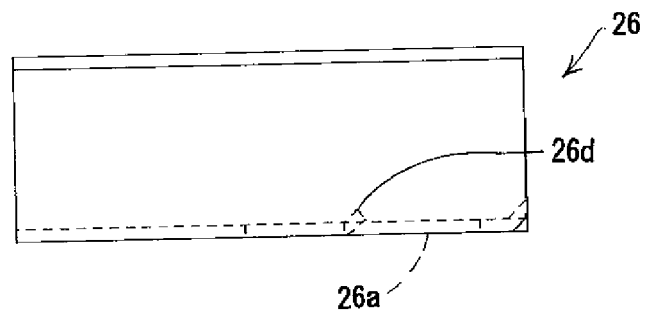
Figure 20:
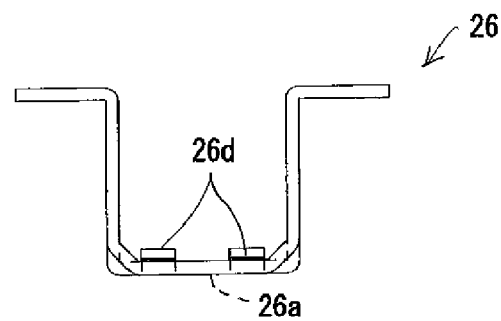

FIG. 20 illustrates a second fixing metal fitting (26). (a) is a plan view, (b) is a front view, and (c) is a right side view.

The second fixing metal fitting (26) is in a shape in which the board is formed in a concave-shape and left and right top ends of the board is bent in a rectangular direction and to opposite sides of each other.

A through hole (26*a*) is provided on a bottom board part of the second fixing metal fitting (26). The through hole (26*a*) is provided for the bolt insertion, the through hole (26*a*) is arranged on the through hole (24*d*) of the common position-adjusting metal fitting (24), and a bolt is inserted into these holes and fixed with a nut.

The through hole (26*a*) is formed in a substantially mushroom shape in planar view in which a narrow width part (261*a*) whose width is narrower than that of a nut screwed with said bolt is connected with a wide width part (262*a*) whose width is wider than that of said nut. Thereby, as described later, when the second fixing metal fitting (26) is arranged and attached on the common position-adjusting metal fitting (24), it becomes possible to attach the second fixing metal fitting (26) without removing a nut for a fixation of the second fixing metal fitting (26), so that construction efficiency can be improved (see FIG. 29 (*c*)).

A bent protrusion (26*d*) is formed on an edge of the wide width part (262*a*). This bent protrusion (26*d*) has a function to prevent a movement of a nut used when the second fixing metal fitting (26) is arranged and attached on the common position-adjusting metal fitting (24).

Hereinafter, a method to fix a solar battery module on a slate roof using a solar battery module fixture according to the second embodiment of the present invention will be set forth.

Figure 21:
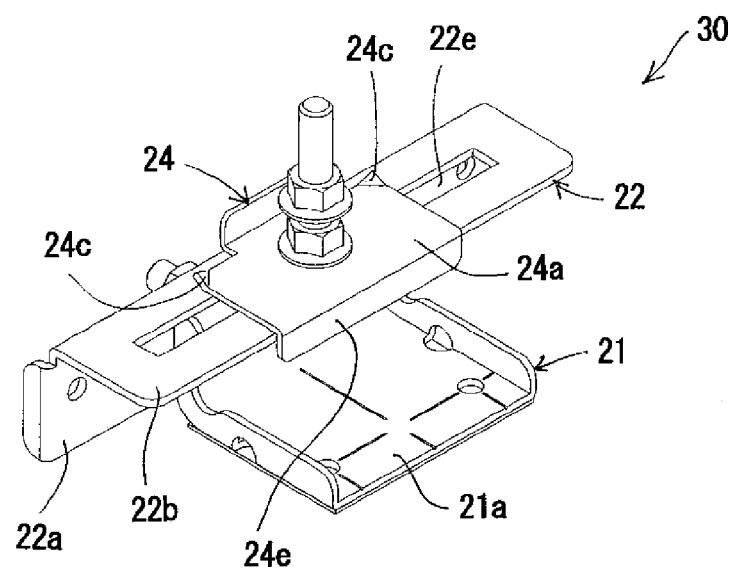
[FIG. 21] It shows an assembly combining a base metal fitting, a height-adjusting metal fitting, and a common position-adjusting metal fitting according to a solar battery module fixture of a second embodiment of the present invention, and its explanatory drawing.
Figure 21:
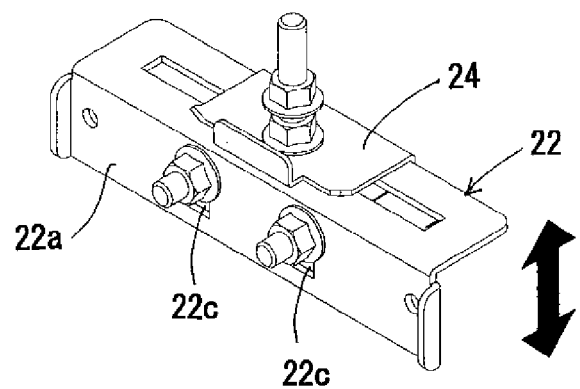

First, an assembly (30) combining the base metal fitting (21), the height-adjusting metal fitting (22), and the common position-adjusting metal fitting (24) is created (see FIG. 21 (*a*)).

The assembly (30) is created as follows.

By overlaying the first long hole (22*c*) provided on the first plate-like part (22*a*) of the height-adjusting metal fitting (22) on the through hole (21*e*) provided on the plate-like extending part (21*b*) of the base metal fitting (21), and inserting a bolt in these holes and tightening a nut, the height-adjusting metal fitting (22) is fixed to the base metal fitting (21). At this time, the second plate-like part (22*b*) of the height-adjusting metal fitting (22) extends to the same direction as the plate-like fixed part (21*a*) of the base metal fitting (21) extends.

Subsequently, by overlaying the through hole (24*d*) provided on the mounting board part (24*a*) of the common position-adjusting metal fitting (24) on the second long hole (22*e*) provided on the second plate-like part (22*b*) of the height-adjusting metal fitting (22), and inserting a bolt and tightening a nut, the common position-adjusting metal fitting (24) is fixed to the height-adjusting metal fitting (22). At this time, the protrusions (24*c*) of the common position-adjusting metal fitting (24) are arranged at the first plate-like part (22*a*) side to face upward and the dropping board part (24*e*) is arranged at the opposite side of the first plate-like part (22*a*) to face down.

The assembly (30) created in this way can adjust the height of the height-adjusting metal fitting (22) by making the height-adjusting metal fitting (22) slide to a longitudinal direction (vertical direction) along the first long hole (22*c*) (see FIG. 21(*b*)). At this time, the plate-like extending part (21*b*) of the base metal fitting (21) is held between the left-right pair of lancing parts (22*d*) of the first plate-like part (22*a*) of the height-adjusting metal fitting (22). Thereby, when the height-adjusting metal fitting (22) slides in a longitudinal direction to the base metal fitting (21), the lancing parts (22*d*) play a role of a guide and the height-adjusting metal fitting slides smoothly without inclining diagonally.

Figure 22:
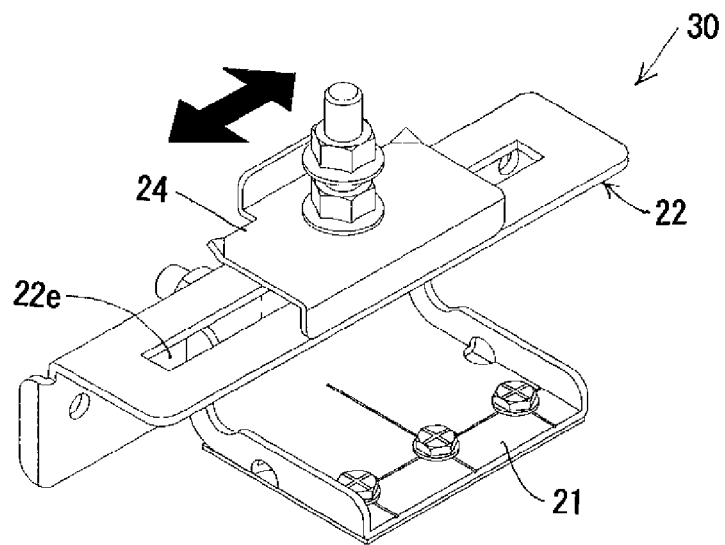
[FIG. 22] It is an explanatory drawing of an assembly combining a base metal fitting, a height-adjusting metal fitting, and a common position-adjusting metal fitting according to a solar battery module fixture of a second embodiment of the present invention.
Figure 22:
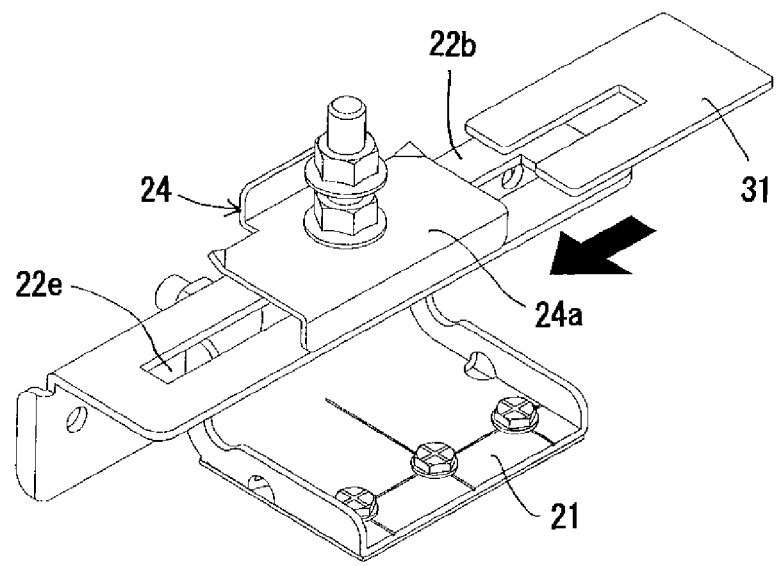

Moreover, by making the common position-adjusting metal fitting (24) slide to a left and right direction (lateral direction to the base metal fitting (21)) along the second long hole (22*e*) (see FIG. 22 (*a*)), a position in a lateral direction to the base metal fitting (21) of the common position-adjusting metal fitting (24) can be adjusted.

Furthermore, as required, the necessary number of U-shaped liner in planar view (height-adjusting board) (31) can be installed between the second plate-like part (22*b*) of the height-adjusting metal fitting (22) and the mounting board part (24*a*) of the common position-adjusting metal fitting (24) (see FIG. 22 (*b*)). This allows a fine adjustment of the height of the common position-adjusting metal fitting (24).

After the creation of the assembly (30) is completed, installation works for a roof is performed as a next step.

Figure 23:
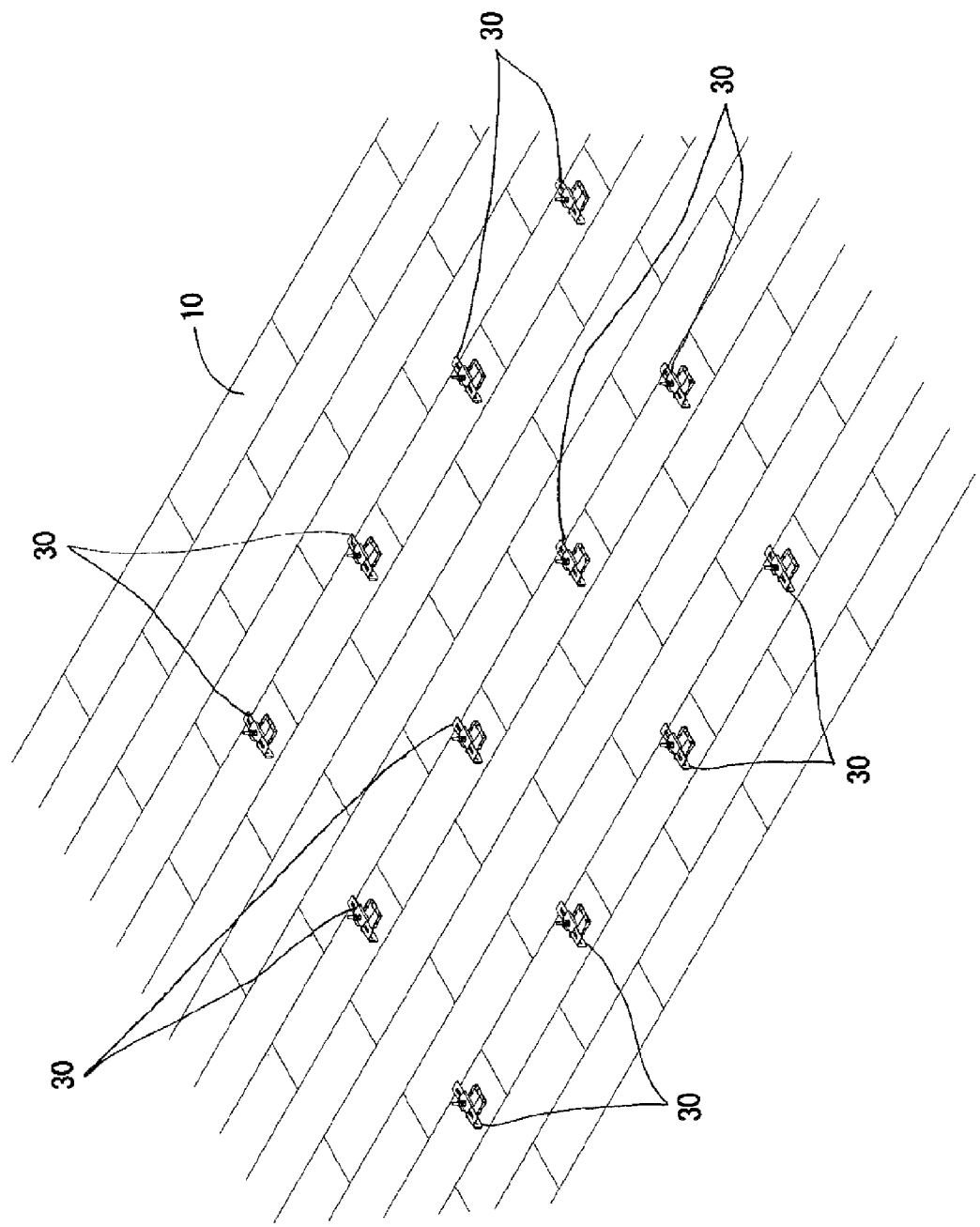
[FIG. 23] It shows that the assembly is fixed on the roof according to the solar battery module fixture of a second embodiment of the present invention.

First, a plurality of assemblies (30) corresponding to the size and the number of solar battery modules fixed on a roof are fixed on a roof (10) (see FIG. 23). In this fixation work, the base metal fitting (21) is temporarily fixed using the two-sided adhesive tape (21*g*) stuck on a lower surface of the plate-like fixed part (21*a*), and then a screw is inserted in the through hole (21*d*) and it is fixed firmly by a screw fastening. At this time, the plate-like fixed part (21*a*) of the base metal fitting (21) is kept from striding over a level difference (joint of a tile) of the roof (10).

In addition, in FIGS. 23, 25, 26, 28, and 30, left lower sides in the figures are eaves edge sides of the roof and right upper sides in the figures are ridge sides of the roof.

Subsequently, a leveling string (not shown in the figure) is stretched among a plurality of the assemblies (30) fixed on the roof (10), and the height-adjusting metal fitting (22) is slid to a longitudinal direction (vertical direction) along the first long hole (22c) (see FIG. 21(b)) so as to make the height of the height-adjusting metal fittings (22) even with the height of this leveling string. In addition, the liner (height-adjusting board) (31) may be used at the time of this height-adjusting if needed (see FIG. 22 (b)).

Figure 24:
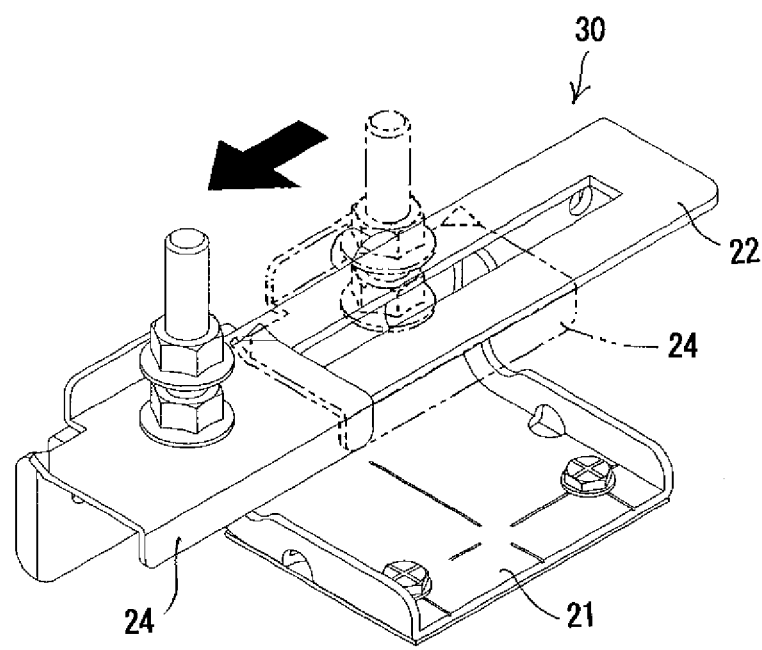
[FIG. 24] It shows how to adjust positions of the common position-adjusting metal fitting according to the solar battery module fixture of a second embodiment of the present invention.
Figure 24:
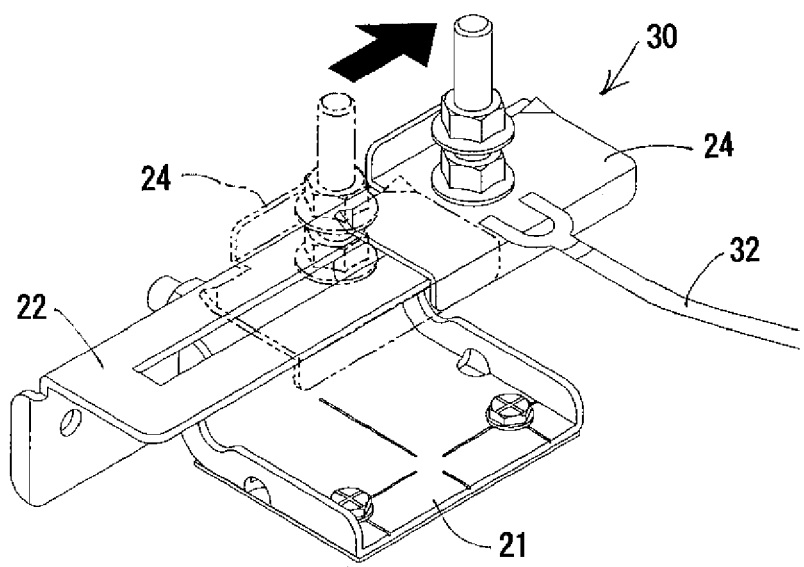
Figure 25:
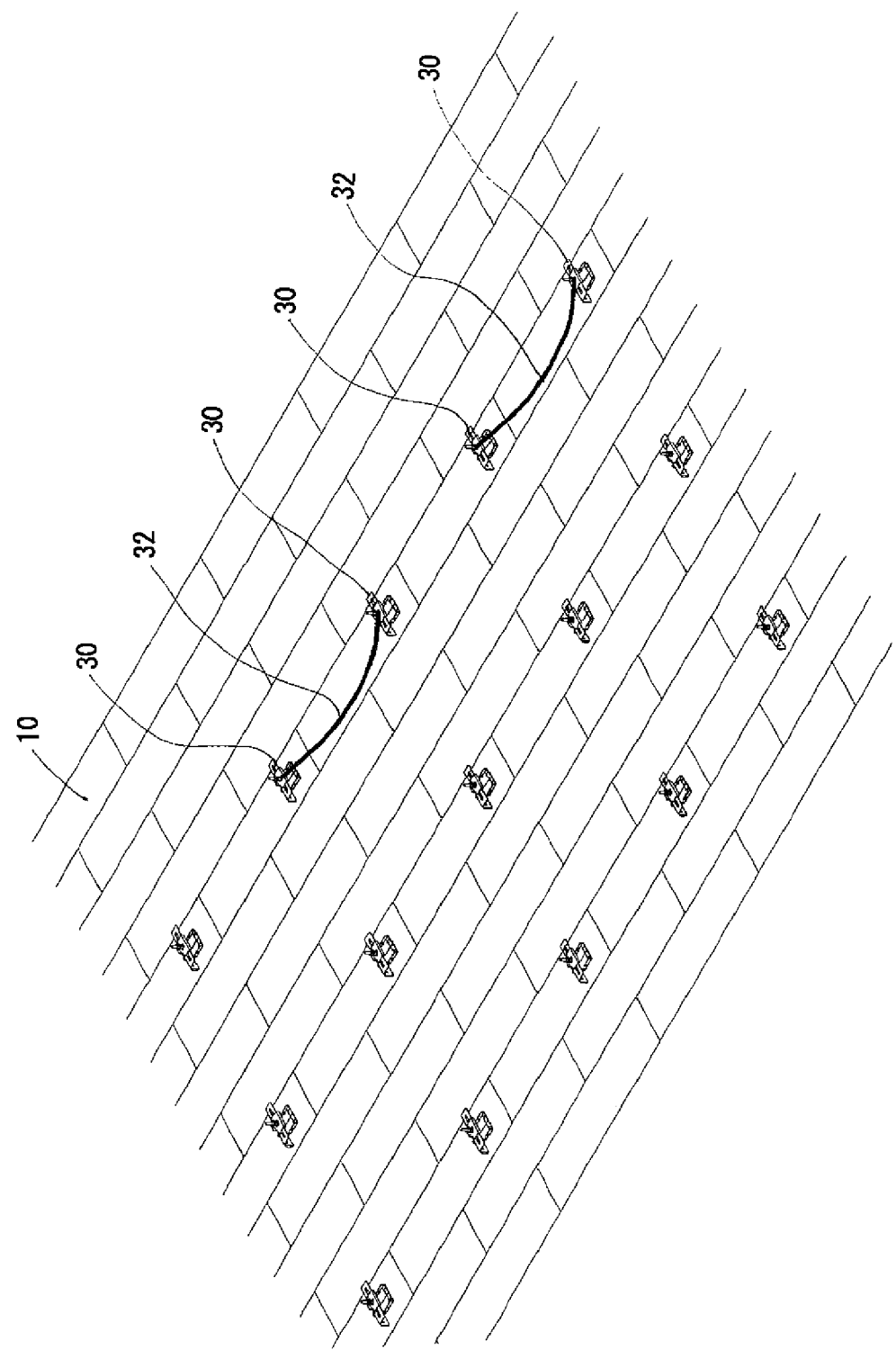
[FIG. 25] It shows that adjacent assemblies are connected via ground wires according to the solar battery module fixture of a second embodiment of the present invention.

In the assembly (30) located on the eaves side among a plurality of assemblies (30) fixed on the roof (10), the common position-adjusting metal fitting (24) is slid to the eaves side and fixed (see FIG. 24 (a)). Moreover, in the assembly (30) located on the ridge side (topmost part), the common position-adjusting metal fitting (24) is slid to the ridge side and fixed by tightening it with a nut (see FIG. 24 (b)). At this time, assemblies (30) fixing adjacent solar battery modules among the assemblies (30) located in the ridge side (topmost part) are connected with a ground wire (32) fixed with its end held between the upper surface of the common position-adjusting metal fitting (24) and the nut (see FIG. 25).

Subsequently, the solar battery module (7) is temporarily placed (see FIG. 26).

Figure 26:
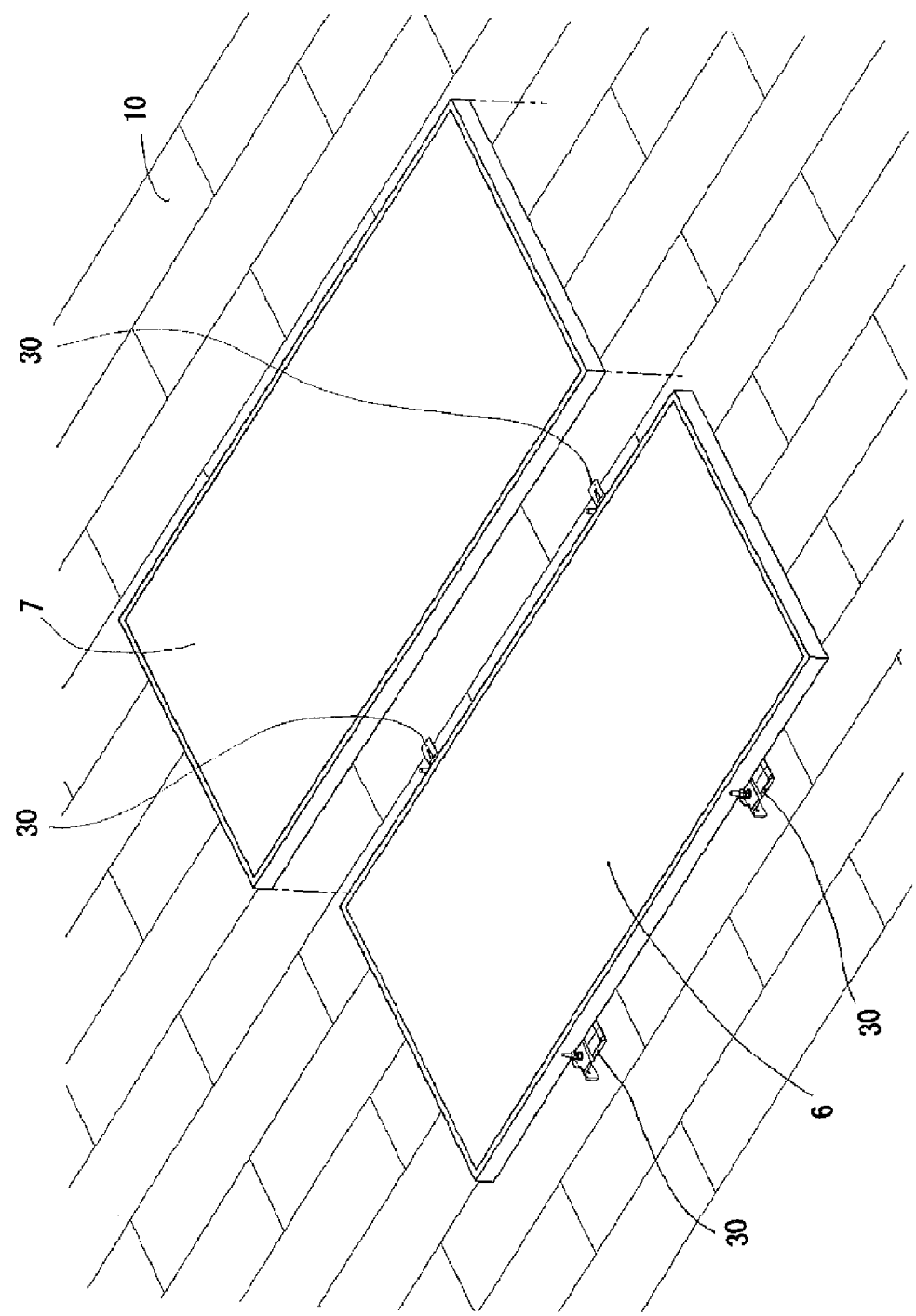
[FIG. 26] It shows a temporarily-placed solar battery module according to the solar battery module fixture of a second embodiment of the present invention.

Additionally, although two solar battery modules (7) are shown in FIG. 26, the number of solar battery modules (7) can vary as appropriate and is not limited.

When the solar battery module (7) is temporarily placed, it is mounted on the mounting board part (24a) of the common position-adjusting metal fitting (24).

At this time, an outer edge of the metal frame (8) attached around the solar battery module (7) can come into contact with the side of the stopper (24b) of the common position-adjusting metal fitting (24). As shown in FIG. 27 (a), in the common position-adjusting metal fitting (24) arranged between the two solar battery modules (7), outer edges of the frames (8) of the different solar battery modules (7) can come into contact with both sides of two stoppers (24b), respectively.

This prevents the solar battery modules (7) from slipping from the roof when it is temporarily placed.

Figure 28:
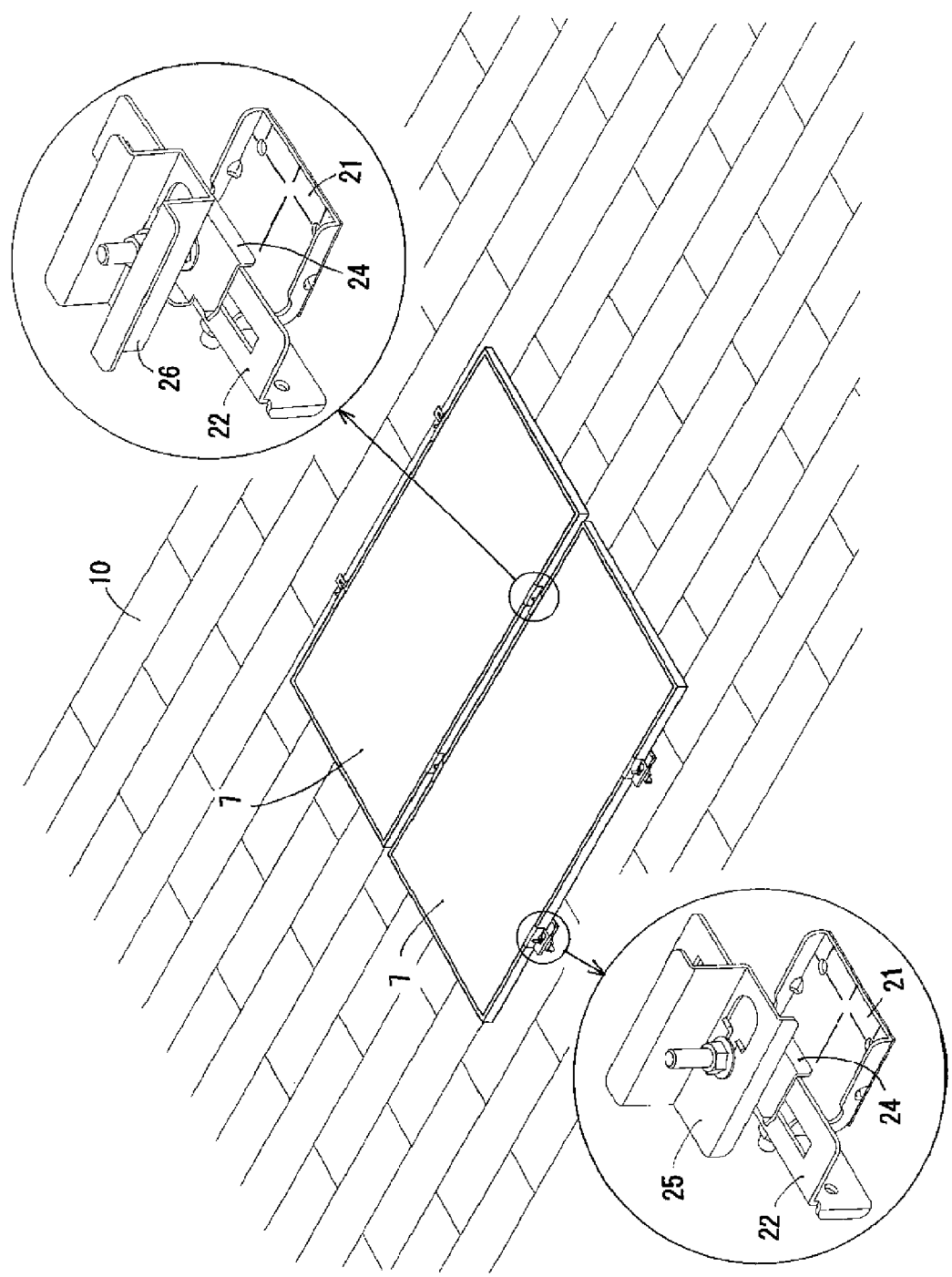
[FIG. 28] It shows that the first fixing metal fitting and the second fixing metal fitting are attached to the common position-adjusting metal fitting, thereby fixing the solar battery module, according to the solar battery module fixture of a second embodiment of the present invention.

After the temporary placement, the first fixing metal fitting (25) and the second fixing metal fitting (26) are attached to the assembly (30) (See FIG. 28).

Figure 29:
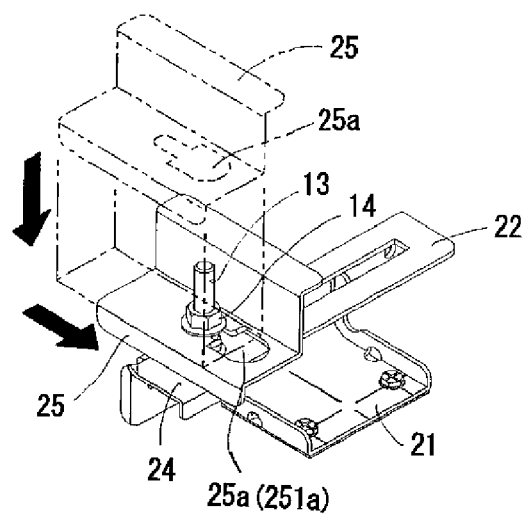
[FIG. 29] It shows the first fixing metal fitting and the second fixing metal fitting are attached to the common position-adjusting metal fitting, according to the solar battery module fixture of a second embodiment of the present invention.
Figure 29:
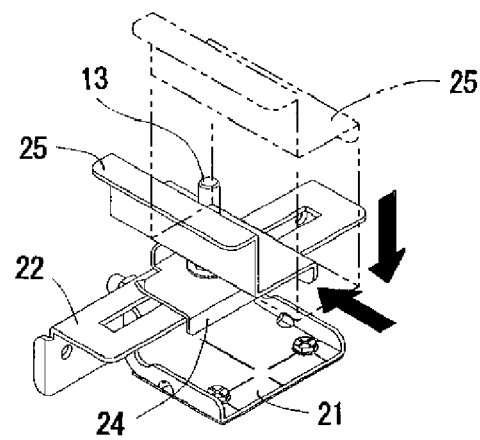
Figure 29:
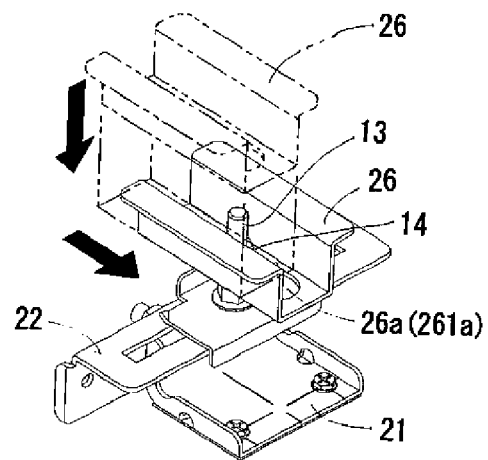

The attachment of the first fixing metal fitting (25) to the common position-adjusting metal fitting (24) is performed by arranging the through hole (25a) of the first fixing metal fitting (25) on the through hole (24d) of the common position-adjusting metal fitting (24), and inserting a bolt (13) in the through hole (25a) and (24d) to screw a nut (14) (see FIGS. 29 (a) and (b)).

The attachment of the second fixing metal fitting (26) to the common position-adjusting metal fitting (24) is performed by arranging the through hole (26a) of the second fixing metal fitting (26) on the through hole (24d) of the common position-adjusting metal fitting (24), and inserting a bolt (13) in the through hole (26a) and (24d) to screw a nut (14) (see FIG. 29 (c)).

Here, the through holes (25a) and (26a) are formed in a substantially mushroom shape in planar view by connecting the narrow width parts (251a) and (261a) whose width is narrower than that of a nut and a wide width parts (252a) and (262a) whose width is wider than that of the nut. Therefore, as shown in FIG. 29 (a) to (c), after the first fixing metal fitting (25) and the second fixing metal fitting (26) are fit into the wide width parts (252a) and (262a) with the nut (14) penetrating through the holes, they can be slid to the narrow width parts (251a) and (261a) to be attached (see imaginary lines and arrow heads). Therefore, a work to remove and tight again the nut (14) is not required, so that construction efficiency can be improved.

Figure 30:
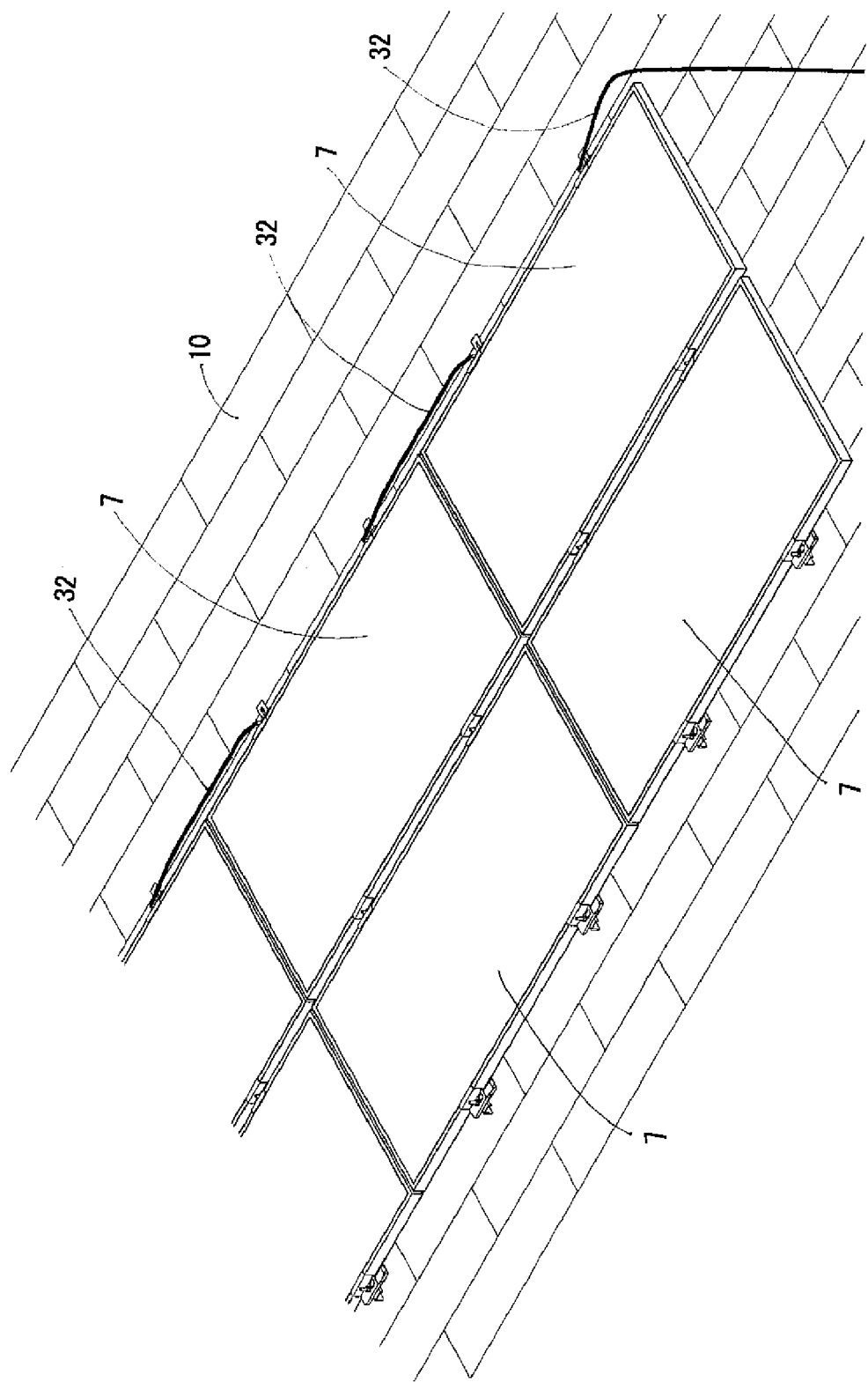
[FIG. 30] It shows the solar battery module fixture attached to the slate roof, according to the solar battery module fixture of a second embodiment of the present invention.

FIG. 30 illustrates a solar battery module (7) fixed on the slate roof (10) by the method shown in FIG. 28. Moreover, FIG. 27 (b) is a cross sectional view of second fixing metal fitting (26) part in this fixed state.

Also in the solar battery module fixture of the second embodiment, as in the first embodiment (see FIG. 15), when the solar battery module (7) must be fixed on a level difference (joint of slate tile) part of the slate roof, the base metal fitting (21) is fixed as not to stride over the level difference of the roof (10). In addition, the common position-adjusting metal fitting (24) may be slid in an upward direction and level difference direction. Consequently, the solar battery module (7) can be fixed to a suitable position without being affected by the level difference (i.e., avoiding level differences).

Moreover, the solar battery module (7) is fixed by the first fixing metal fitting (26) and the second fixing metal fitting (25) when an outer edge of the frame (8) can come into contact with the stopper (24b) of the common position-adjusting metal fitting (24).

Furthermore, the lower surface of the frame (8) of the solar battery module (7) is pressed against the protrusions (24c) of the common position-adjusting metal fitting (24) by the first fixing metal fitting (26) and the second fixing metal fitting (25). Thereby, a coating of the frame (8) is damaged by the protrusions (24c), the conducting part (metal part) of the frame (8) is exposed, and thus, an electrical connection of the conducting part with the common position-adjusting metal fitting (24) is secured. Therefore, an electrical connection is secured in the solar battery module (7) lined up in a direction from the ridge side to the eaves side of the roof. Moreover, in the solar battery module (7) lined up in a row direction of the roof (in a rectangular direction to the direction from the ridge side to the eaves side), it becomes possible to process a ground without additional preparation of metal fittings for ground, if the ground wire (32) is connected to the common position-adjusting metal fitting (24). In addition, the ground wire (32) is grounded on the ground.

Since the stopper (24b) and the protrusions (24c) are provided on the common position-adjusting metal fitting (24), they slide integrally with the common position-adjusting metal fitting (24) in adjusting a position of the solar battery module (7). Therefore, when the fixed position of the solar battery module is adjusted, slip prevention function for the temporarily-placed solar battery module and ground processing function can be fulfilled, too.

A binding band (34) is inserted by the small hole (22g) provided on the height-adjusting metal fitting (22), and a distributing cable (33) connected to the solar battery module (7) is fixed using this binding band (34).

In addition, also in the second embodiment, an eaves cover can be attached if needed.

Figure 31:
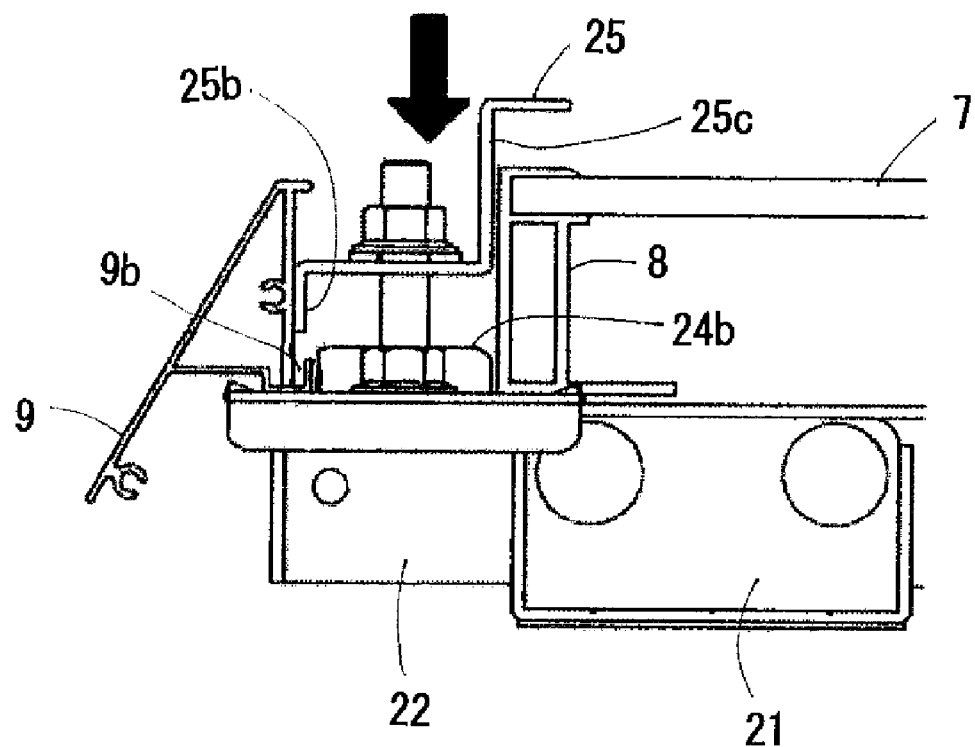
[FIG. 31] It shows that an eaves cover is attached, according to the solar battery module fixture of a second embodiment of the present invention.
Figure 32:
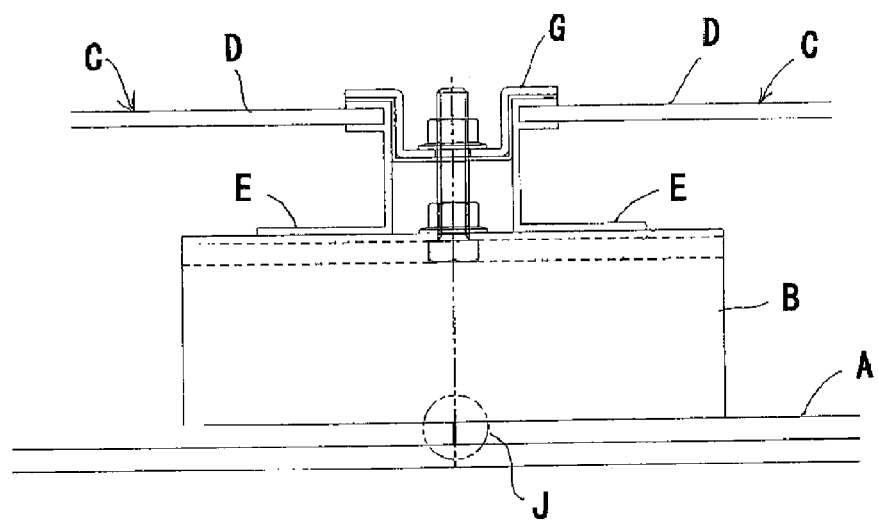
[FIG. 32] It shows that the solar battery module is fixed on the slate roof using a conventional fixture.
Figure 32:
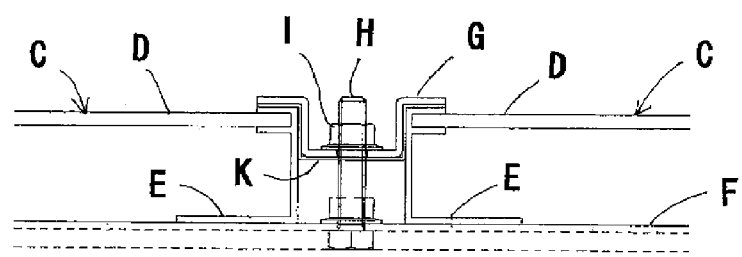

As shown in FIG. 31, an eaves cover (9) can be attached by fitting a bottom end of a lower longitudinal direction part (25b) of the first fixing metal fitting (25) into a concave slot (9b) formed along a length direction of the eaves cover (9). At this time, the lower longitudinal direction part (25b) of the first fixing metal fitting (25) functions to position the eaves cover (9) by coming into contact with an inner surface of the eaves cover (9).

A shape and size of each metal fitting which constitutes the solar battery module fixture according to the present invention is not limited in the illustrated examples and can suitably vary within a range in which the purpose of the present invention can be achieved. Moreover, a method and a procedure for fixing the solar battery module on a slate roof using the solar battery module fixture according to the present invention are also not necessarily limited to the above-mentioned methods and procedures.

INDUSTRIAL APPLICABILITY

The present invention can be used for fixing the solar battery module on a slate roof of various buildings such as a house.

EXPLANATION OF REFERENCE NUMBERS 1, 21 Base metal fitting
1a, 21a Plate-like fixed part
1a1 First fixed part
1a2 Second fixed part
1b, 21b Plate-like extending part
1f Projection part
2, 22 Height-adjusting metal fitting
2a, 22a First Plate-like part
2b, 22b Second Plate-like part
2c, 22c First long hole
2d, 22d Lancing part
2e, 22e Second long hole
3, 23 First position-adjusting metal fitting
3a, 23a Mounting board part
3b Eaves cover fixed part
3c Protrusion part
3f Guide part
4, 24 Second position-adjusting metal fitting
4a, 24a Mounting board part
4b, 24b Stopper
4c, 24c Protrusion part
5, 25 First fixing metal fitting
25a Through hole
251a Narrow width part
252a Wide width part
5b, 25b Lower longitudinal direction part
5c, 25c Upper longitudinal direction part
6, 26 Second fixing metal fitting
26a Through hole
261a Narrow width part
262a Wide width part
7 Solar battery module
8 Frame
9 Eaves Cover
10 Roof
12 Level Difference (Joint)
13 Bolt
14 Nut

The invention claimed is:

1. A solar battery module fixture for fixing a solar battery module on a slate roof, comprising:
a plurality of base metal fittings to be fixed on a top surface of said roof,
a height-adjusting metal fitting attached to said base metal fittings so that it can slide longitudinally,
a position-adjusting metal fitting attached to said height-adjusting metal fitting so that it can slide laterally, and
a fixing metal fitting attached to said position-adjusting metal fitting for fixing the solar battery module by vertically holding the solar battery module with said position-adjusting metal fitting,
said position-adjusting metal fitting comprising:
a mounting board part for placing the solar battery module,
a stopper which can come into contact with edges of a frame provided around said solar battery module when it is placed on said mounting board part, and
a protrusion for ensuring electric connection with said frame by coming into contact with a conducting part of said frame while said solar battery module is fixed.

2. The solar battery module fixture according to claim 1, said base metal fittings consisting of a plate-like fixed part fixedly-contacting with said top surface of said roof and a plate-like extending part arranged perpendicular to said top surface of said roof,
said height-adjusting metal fitting consisting of a first plate-like part arranged perpendicular to said top surface of said roof and a second plate-like part arranged in parallel to said top surface of said roof,
said first plate-like part having a first long hole which is longer in a direction perpendicular to said top surface of said roof,
said second plate-like part having a second long hole which is longer in a direction in parallel to said top surface of said roof,
said height-adjusting metal fitting being attached to said base metal fittings by fixing said plate-like extending part and said first plate-like part with a bolt inserted into said first long hole, so that said height-adjusting metal fitting can slide longitudinally,
said position-adjusting metal fitting being attached to said height-adjusting metal fitting by fixing said mounting board part and said second plate-like part with a bolt inserted into said second long hole, so that said position-adjusting metal fitting can slide laterally.

3. The solar battery module fixture according to claim 2, said first plate-like part of said height-adjusting metal fitting having a left-and-right pair of lancing parts which project in an extending direction of said second plate-like part and extends in parallel to said first long hole,
a plate-like extending part of said base metal fitting being held between said left-and-right pair of lancing parts.

4. The solar battery module fixture according to claim 1, said fixing metal fitting consisting of a first fixing metal fitting arranged at the end of a plurality of solar battery modules arranged on the roof and a second fixing metal fitting arranged among said plurality of solar battery modules,
said first fixing metal fitting being formed by folding a flat plate in a staircase pattern so that said flat plate can have two lateral parts and two longitudinal parts,
said two longitudinal parts being two-tiered in parallel to each other, an upper longitudinal part of said two-tiered longitudinal parts comes into contact with outer edge of said frame of said solar battery module and a lower longitudinal part positions an eave cover for covering end surface on eaves edge side of said solar battery modules.

5. The solar battery module fixture according to claim 1, said position-adjusting metal fitting consisting of a first position-adjusting metal fitting arranged at the eaves edge side of a roof, and a second position-adjusting metal fitting arranged at the other side of the roof,
said first position-adjusting metal fitting comprising an eaves cover fixed part for fixing the eaves cover which covers the eaves edge side of the solar battery module, said second position-adjusting metal fitting comprising said two stoppers arranged with some space therebetween, and said stoppers coming into contact with an inner edge of said frame.

6. The solar battery module fixture according to claim 2, said plate-like fixed part of said base metal fittings consisting of a first fixed part extending in one direction, and a second fixed part extending in a direction opposite to the direction in which the first fixed part extends, said second fixed part being formed by making a cut in a part of said plate-like extending part and folding the cut part, and a protrusion formed by upwardly transforming a board forming said plate-like fixed part being provided so that the protrusion strides over said first fixed part and said second fixed part.

7. The solar battery module fixture according to claim 1, said position-adjusting metal fitting consisting of a common position-adjusting metal fitting with a common structure arranged at the eaves edge side and at the other side of a roof, said common position-adjusting metal fitting comprising said stopper and said protrusion, said stopper consisting of one stopper which can come into contact with outer edge of said frame, and said protrusion being formed by upwardly folding corners of said mounting board part.

8. The solar battery module fixture according to claim 4, said first fixing metal fitting and said second fixing metal fitting being separately fixed to said height-adjusting metal fitting and said position-adjusting metal fitting by a bolt and a nut, said first fixing metal fitting and said second fixing metal fitting being provided with through holes for insertion of said bolt, said through holes being formed by connecting a narrow width part which is narrower than a diameter of said nut and a wide width part which is wider than a diameter of said nut.

9. The solar battery module fixture according to claim 8, an upwardly-folded projection being formed at the edge of said wide width part.

* * * * *